United States Patent [19]
Wiklund

[11] Patent Number: 5,326,982
[45] Date of Patent: Jul. 5, 1994

[54] ANALOGUE DISPLACEMENT SENSOR

[75] Inventor: Rudolf Wiklund, Täby, Sweden

[73] Assignee: Geotronics AB, Danderyd, Sweden

[21] Appl. No.: 924,008

[22] PCT Filed: Mar. 22, 1991

[86] PCT No.: PCT/SE91/00224
§ 371 Date: Jan. 1, 1993
§ 102(e) Date: Jan. 1, 1993

[87] PCT Pub. No.: WO91/14923
PCT Pub. Date: Oct. 3, 1991

[30] Foreign Application Priority Data
Mar. 23, 1990 [SE] Sweden .............................. 90010646
Mar. 23, 1990 [SE] Sweden .............................. 90010653
Mar. 23, 1990 [SE] Sweden .............................. 90010661

[51] Int. Cl.[5] .................................................. G01N 21/86
[52] U.S. Cl. ........................................ 250/561; 33/558
[58] Field of Search ............... 250/216, 561, 231.1, 250/215; 33/366, 556, 558, 561, 561.2, 558.01, 558.02

[56] References Cited
U.S. PATENT DOCUMENTS

| | | |
|---|---|---|
| 4,521,973 | 6/1985 | Wiklund et al. |
| 4,896,110 | 1/1990 | Shimizu et al. ..................... 33/558 |
| 4,972,597 | 11/1990 | Kadosaki et al. .................... 33/556 |
| 5,012,591 | 5/1991 | Asakawa ............................. 33/558 |
| 5,058,433 | 10/1991 | Wilson et al. ....................... 33/561 |

FOREIGN PATENT DOCUMENTS

| | | |
|---|---|---|
| 0330901 | 9/1989 | European Pat. Off. . |
| WO88/02846 | 4/1988 | PCT Int'l Appl. . |
| WO89/08817 | 9/1989 | PCT Int'l Appl. . |
| 2071332 | 9/1981 | United Kingdom . |

Primary Examiner—David C. Nelms
Attorney, Agent, or Firm—Pollock, Vande Sande & Priddy

[57] ABSTRACT

The invention relates to an analogue sensor for sensing deviation from a normal position in at least two directions. The sensor senses dimensions in at least one direction and for this purpose it has a ball (52) at the tip of a measuring stick (51), which is resiliently mounted in such a manner that it can move essentially about a center. It is the deviation of the tip from its normal position which is to be indicated. The stick has a sensor portion (8, 9; 54, 55; 71, 72) placed in a sensor unit, in such a manner that the sensor portion, upon external displacing force upon the measuring tip in any direction can be advanced from a normal position, essentially about a central point (CM; CM') and is returnable to the normal position by means of a force device (3; 21; 30; 53; 73; FIGS. 7A–7C, FIGS. 9A, 9B). The advancement from the normal position about the central point is indicated to provide a measure of the deviation. Thus the sensor provides angular sensing for displacement forces of said sensor tip acting in a plane perpendicular to a symmetry axis of the sensor and a linear sensing for a displacement force acting on the tip axially of the sensor.

33 Claims, 14 Drawing Sheets

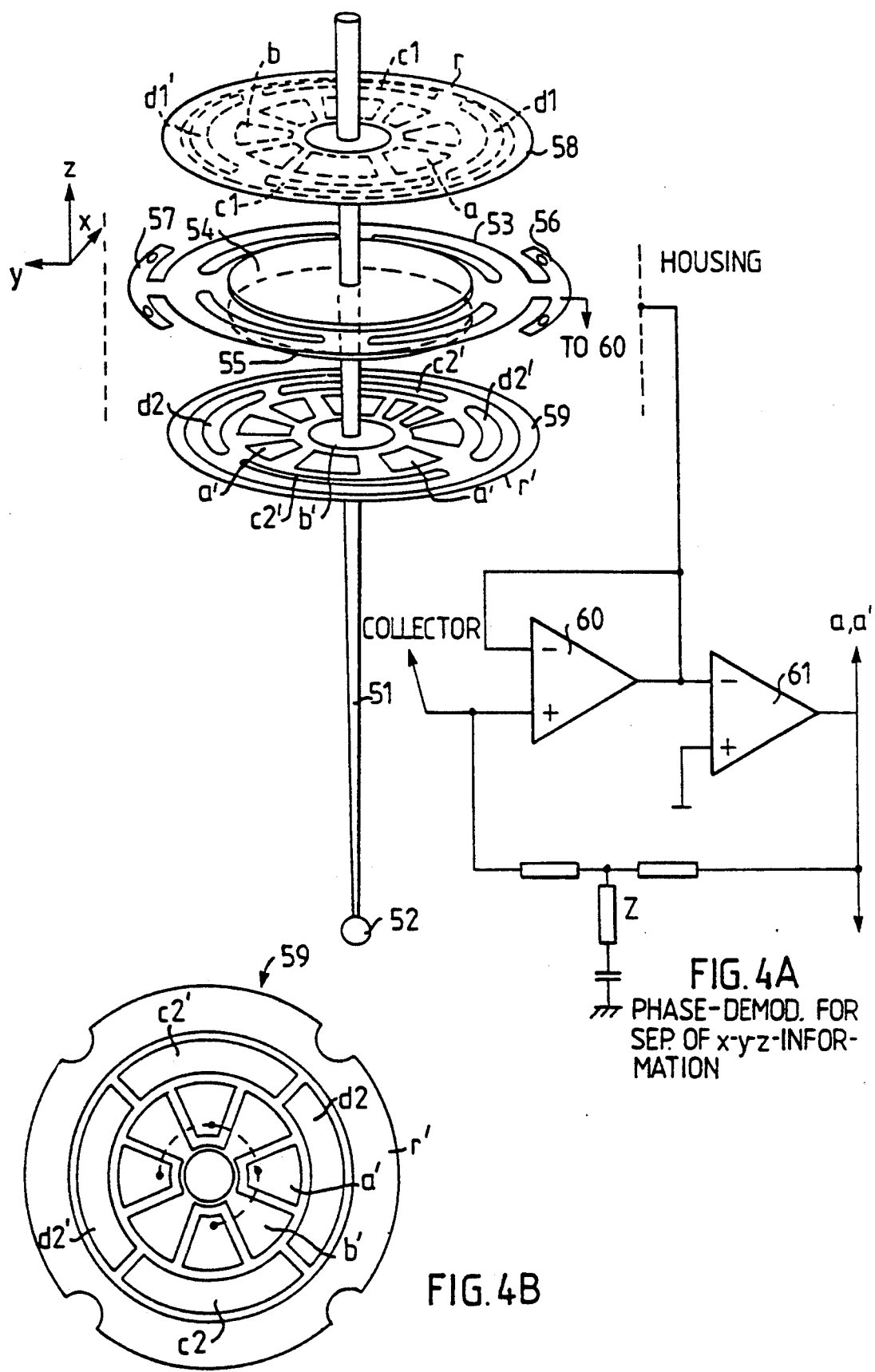

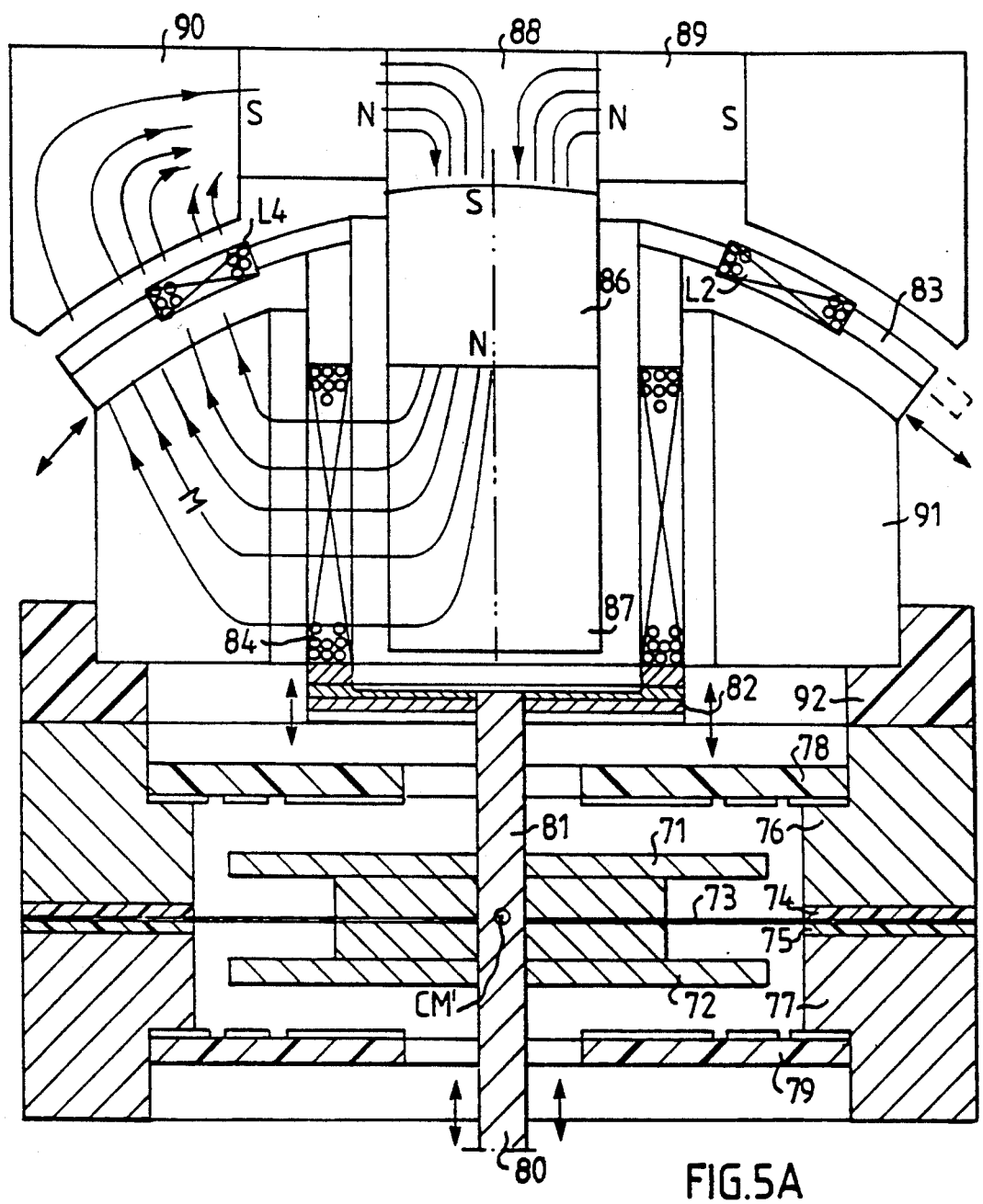
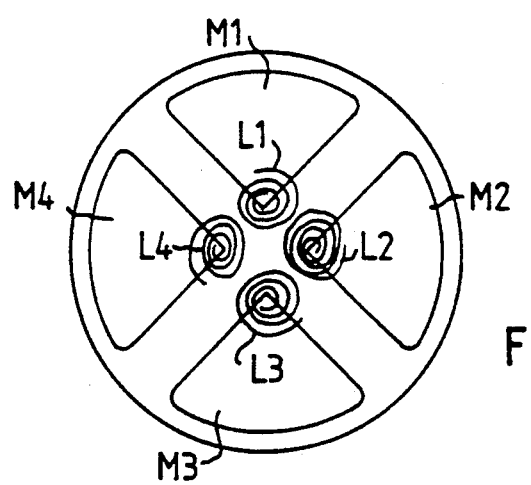
FIG.5A
FIG.5B

LATERALLY ENERGIZED 8 POLES

ANALOGUE DISPLACEMENT SENSOR

The present invention relates to an analogue sensor.

For precision measurement of mechanical components, e.g. coordinate measuring machines, various types of measuring probes are used. The most common type is based on the principle that a current contact path is broken if the tip of the probe, which often has the shape of a ball, is moved in any direction (x, y, z) by striking an object, thus overcoming a certain spring force, whereupon a current path is broken and the measured value is read instantaneously. More precise measuring machines are based on the principle of arranging a number of differential transformers, e.g. three, so that they, with the aid of linkage arms, can measure movements in an analogue manner in the x-, y- and z-directions. This provides the advantages that striking forces are eliminated and deviation can occur over a certain period of time (integrated). This increases the accuracy of the measured value.

Such probes are, however, expensive and complicated in their construction. They also have relatively heavy masses in the sensing portion, and the measuring speed is thus low, which means that the entire measuring system will have a relatively low total measuring capacity. Good measuring capacity together with measuring quality is very essential for a measuring system of this type.

The main purpose of the invention is to increase the measuring precision and to reduce the mass of the moving components of a probe as well as substantially increasing the capacity of the measuring machine, in an application, in which the probe is functioning as a measuring system of its own in the measuring machine system.

The PCT-application having the International Publication Number WO 90/00717 describes a probe for a position-determining apparatus including a stylus which is suspended rotational around a point of rotation in a low-friction support. Coordinate measurements in only two dimensions can be achieved. The angular deviation of the stylus caused by touching an obstacle is measured by an optical measurement arrangement. The possibility of having an auxiliary force supply is briefly mentioned.

A first main object of the invention is to provide an analogue sensor for three-dimensional measurements functioning as a measuring system of its own.

A second main object of the invention is to provide a functional force supplier for use in an analogue sensor.

A third main object of the invention is to provide a measuring arrangement for measuring an object which combines mechanical measuring and optical measuring in a single measuring head.

According to the solution of the first object the stick is suspended floatingly such that it can rotate around a rotation center but that the rotation center can move in a direction axial to the probe. In order to achieve this the stick is either suspended in a spring means or free floating in a device held in the space by a magnetic free hovering arrangement. based on the variation of capacitance is demodulated without phase shift and is filtered. The moveable element or elements can as an alternative change places with the fixed elements, so that the moveable elements will be the driving elements.

DESCRIPTION OF THE FIGURES

According to the solution of the second object the force supplier is adapted to a probe in a coordinate measuring machine, said probe having an analogue sensor including a sensing part, sensed by said sensor when a sensing element coupled to the movable sensing part touches an obstacle and is thus displaced, including a force supplier portion fixedly connected to the movable sensing part of the sensor and a second force supplier portion fixedly connected to the stationary sensing part of the sensor and by control means providing electrical control signals to said force supplying arrangement to set said sensor in a required form of displacement, and is characterized by control means providing electrical control signals to said force supplying arrangement to set said sensor in a required form of displacement, said control means being fed with the measuring signals from said sensing means and providing reaction on touching to an object for said stick being in a displaced position from its neutral position caused by said force supplying means.

According to the third main object of the invention a measuring arrangement for optical and mechanical measuring of a measuring object including a distance measuring unit of optical type having a lens unit and means for focusing on the measuring object, and a mechanical sensor for measuring the position of the measuring object. The sensor has a measuring tip, which, at mechanically provided measuring against the measuring object, is displaceable towards the measuring object along the optical axis of the lens unit and in the meantime is placed on the optical axis withdrawn form the measuring object.

The invention will be described in more detail below with reference to the accompanying drawings, where FIGS. 4A, 4B, 4C and 4D show a schematic assembly drawing, a pattern plate and two circuit diagrams of different measuring arrangements for a fourth embodiment of the analogue sensor according to the invention, FIGS. 5A and 5B show a sectional view and a schematic diagram of the windings and magnetic fields in a first embodiment of a sensor provided with a force supplier.

DESCRIPTION OF THE PREFERRED EMBODIMENT

Figure 1A:
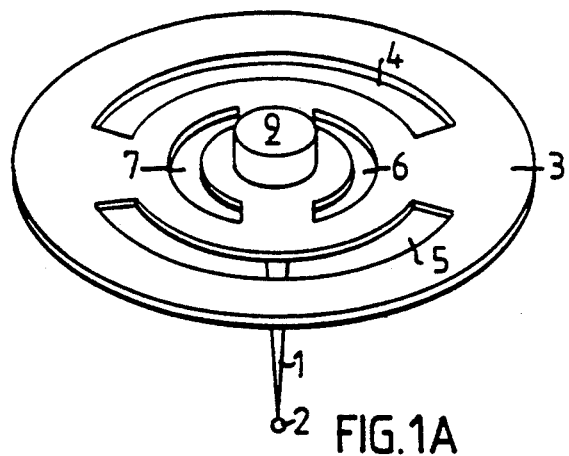
FIGS. 1A, 1B and 1C show different parts of and an assembly of a first embodiment of the analogue sensor according to the invention.
Figure 1B:
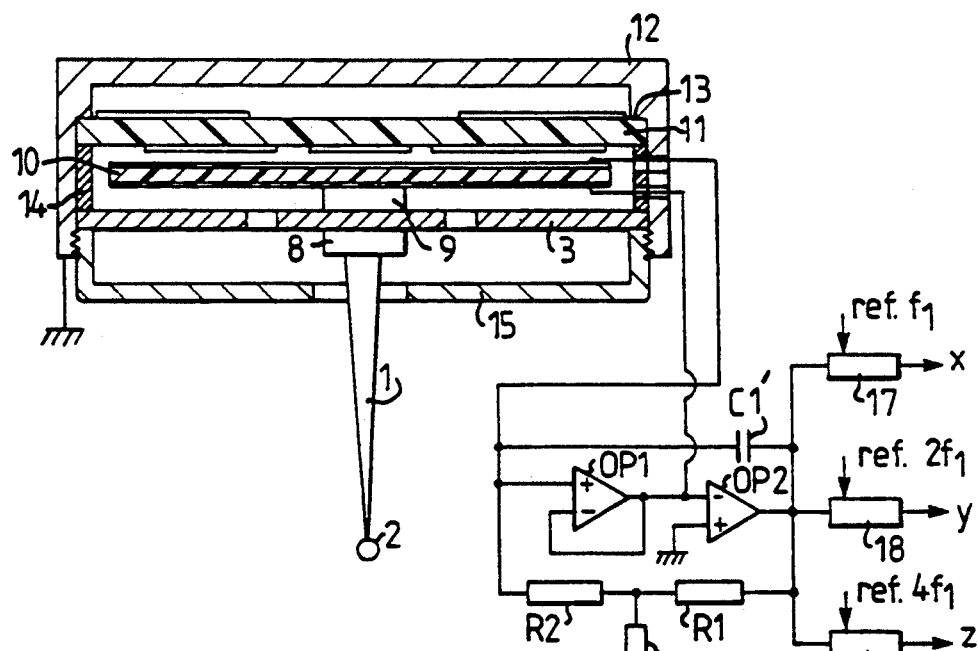

A somewhat conical stick 1 with a measuring ball 2, preferably safire, as a measuring point is fixed in the centre of a "planar" circular spring 3, as shown in FIGS. 1A and 1B. The spring 3, which is shown in detail in FIG. 1A, is provided with almost semi-circular holes 4–7, which are placed so that they provide a spring coefficient which is essentially equal in the x-, y- and z-directions as measured in relation to the force on the measuring tip. Two of the holes 4, 5 are placed symmetrically on either side of the y-axis and two holes 6, 7 are placed symmetrically on either side of the x-axis. This results in an essentially iso-elastic function as the ball strikes the measuring object. Other types of spring arrangements than the flat spring shown, which provide the iso-elastic function, are of course conceivable. It is also conceivable to use a gimballed suspension instead.

As best can be seen in FIG. 1B, the stick 1 is securely fixed to the centre of the spring by two inter-engaging fastening means, 8, 9, on either side of the spring 3, e.g. a bolt and a nut. A disc 10 is fixed to the means 9 remote from the stick 1. The disc 10 thus moves as the stick 1 moves, since it is directly joined to the stick 1. The disc 10 is preferably made of electrically non-conducting material and has a coating of electrically conducting material on either side.

A disc 11 of electrically non-conducting material, e.g. a laminate, is fixed in a stationary manner above the disc 10, so that it is normally parallel to the disc 10, i.e. when the stick 1 with the measuring ball 2 is unloaded, not having struck against any object. The disc 11 is provided with a conducting pattern on either side. The pattern facing the disc 10 is shown with solid lines in FIG. 1C, and the pattern placed on the side facing away from the disc 10 is shown with dashed lines. The disc 10 is thus shown in FIG. 1C upside down in relation to the view in FIG. 1B.

Examples of the mounting means for the arrangement are shown in FIG. 1B, i.e. a cup-shaped cover 12 provided with a heel 13 adjacent its bottom. The disc 11 rests with its upper portion, as shown in the Figure, against the heel 13. A ring 14 is inserted into the cover 12 and abuts against the lower portion of the disc 11 as shown in the Figure. The upper portion of the spring 3 rests against the lower portion of the ring 14 as shown in the Figure. The axial length of the ring 14 is adapted so that the disc 10 moves sufficiently for measurement in the space between the spring 3 and the disc 11. The outer end of the cover 12 is internally threaded. An additional cup-shaped cover 15 with a hole of sufficient diameter for movement of the stick 1 is screwed into the cover 12 and keeps the spring 3 in place.

Figure 1C:
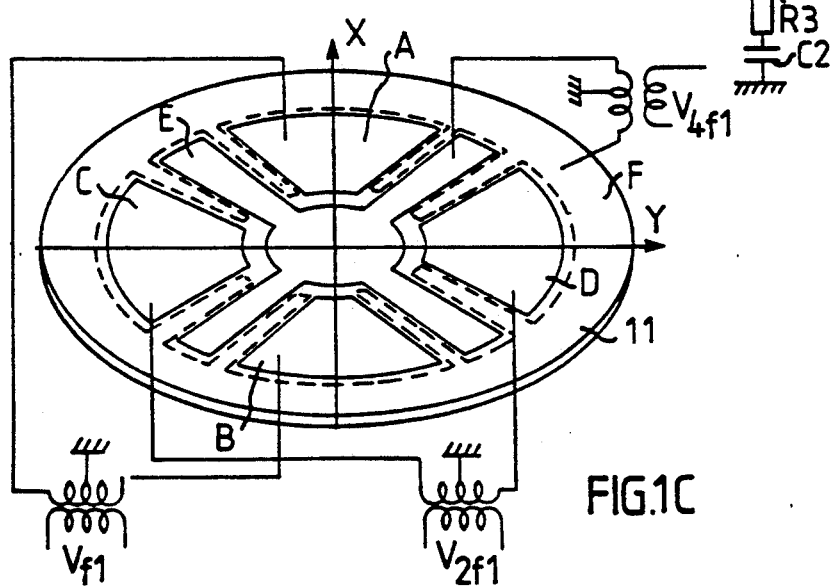

The conducting pattern in FIG. 1C on the underside of the disc 11 (facing upwards in the Figure) is divided into five pattern segments or electrodes A, B, C, D, E of conducting material, of which four A–D have the form of essentially triangular segments with the inner point removed and with two straight sides intersecting close to the centre of the disc 11, the third side extending along a circular path a certain distance from the periphery of the disc. The four segments A–D are evenly spaced and form a pattern which is symmetrical about the two orthogonal axes x and y intersecting in the centre of the disc 11.

The fifth pattern segment, or the electrode E, is made as a cross with its borders placed symmetrically between adjacent straight sides of the pattern segments A–D. The pattern segment F, shown with dashed lines on the reverse side of the disc 11 (downwards in FIG. 1C), is annular in shape and lies diametrically outside the pattern segment A–E and has an inwardly directed finger in each space between the straight portions of the pattern segments A–D. The radial fingers on the pattern segments E and F are not entirely necessary for proper functioning, but they increase the electrode surface and therefore provide higher capacitance.

Each of the segments A–F in the conducting patterns serves as a plate or electrode of a capacitor, the other plate or electrode of which being the upper conducting layer on the plate 10 which moves with the stick 1. Since the electrode F cooperates with the upper conducting coating on the plate 10, it is placed so that none of the pattern segments A–E anywhere acts as a screen between the plate 10 and the electrode F.

FIGS. 1A–1C show a variant which works with single sensing. This variant is best suited for sensing the displacement of the measuring ball only in the x- and y-directions. However, it is to be noted that the probe as such is sensing angularly for these directions, i.e. is sensing the angular deviation around a centre point situated in the intersection between the stick 1 and the spring 3. An example of voltage measurement of the conducting patterns with the electrodes A–F is shown in FIG. 1C. A voltage $V_{f1}$ with the frequency f1 is supplied between the electrodes A and B, lying along the x-coordinate. A voltage $V_{2f1}$ with twice the frequency, i.e. 2*f1, is supplied between the electrodes C and D along the y-coordinate. A voltage of $V_{4f1}$ with four times the frequency, i.e. 4*f1, can be supplied between the electrodes E and F if deviation along the z-coordinate is also to be indicated.

Indication of capacitance displacement in the three sensing directions x, y and z, when the displacements along the x- and y-directions are angularly sensed, is accomplished with a circuit shown very schematically in FIG. 1B. The upper coating on the moveable plate 10 is coupled to the (+)-inport of the first operation amplifier OP1. The (−)-input of the amplifier OP1 is coupled to its output. The lower conducting coating on the plate 10 forms a capacitor with the upper coating and is bootstrap-coupled to the output of the first amplifier OP1. The output of the amplifier OP1 is coupled to the (−)-input of the second amplifier OP2. The (+)-input of the amplifier OP2 is coupled to earth and its output is negatively AC feed-back coupled to the (+)-input of the amplifier OP1 with a capacitor C1. There is also a direct current feed-back from the output of the amplifier OP2 to the (+)-input of the amplifier OP1 via a series connection, usual for this purpose, of two resistors R1 and R2, the connecting point of which is AC-decoupled to earth through a low-ohmic resistor R3 and a capacitor C2.

The housing 12 of the unit is grounded. The output of the amplifier OP2 is coupled to three phase detectors 17, 18 and 19. Each of these are supplied with a square voltage reference signal, or alternatively a triangular or sine voltage. For each of these, the sensing inverval extends over a half period, which provides a signal processing, "demodulation", of the signal without phase shifts for each sensing direction. The output signal from each of the phase detectors is amplified (not shown) and the amplified output has a pre-determined relation to the angular deviation in the direction coupled to a voltage with the same reference frequency as is fed to the phase detector in question.

As can be seen in FIGS. 1B and 1C, the pattern segments A, B and C, D for indicating the movements of the tip 2 in the x- and y-directions, respectively, form with the upper conducting layer of the plate 10 two pair of capacitors, where the capacitors in each pair change essentially in a balanced manner in opposite directions as the plate 10 is inclined. The capacitors formed by the pattern segments E and F intended for z-axis indication and the coating of the plate 10 change in the same direction. This makes a displacement in the z-direction difficult to indicate assurance with the embodiment shown in FIG. 1, which is primarily intended as an x-y-displacement sensor.

Figure 2A:
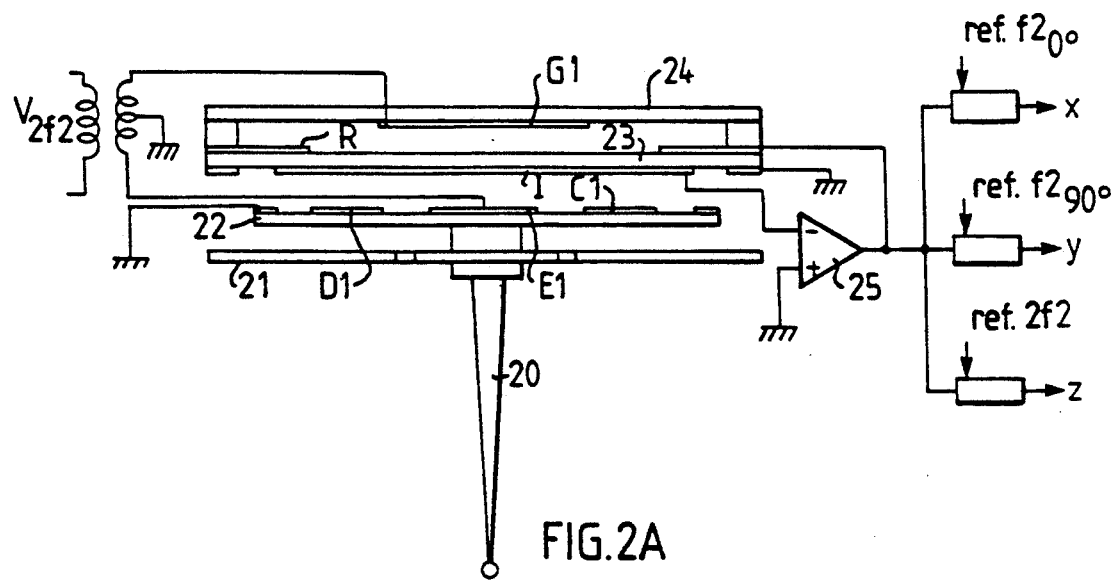
FIGS. 2A and 2B show a schematic assembly drawing and a component of a second embodiment of the analogue sensor according to the invention.
Figure 2B:
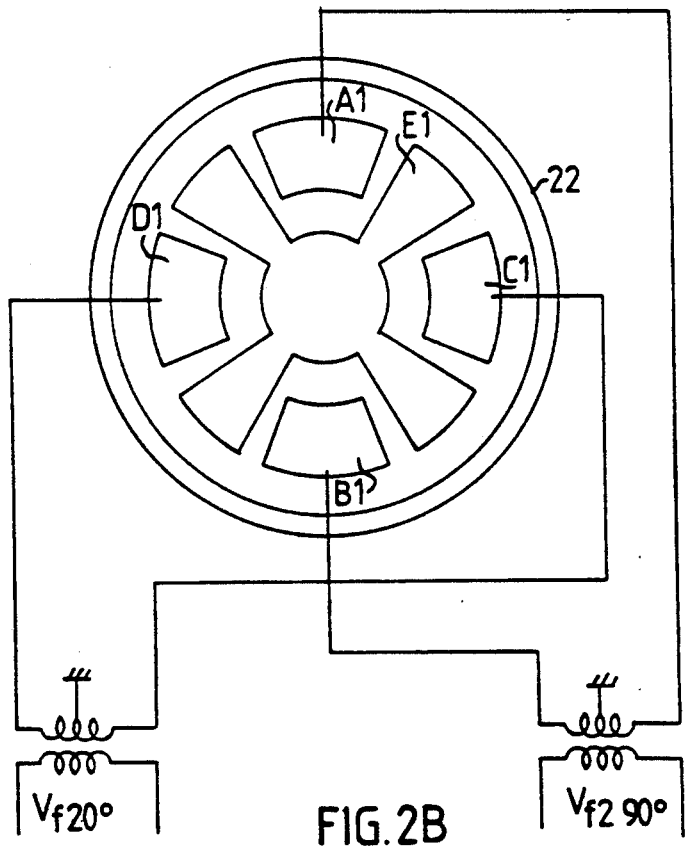

FIGS. 2A and 2B show a second embodiment of the sensor according to the invention. The conducting electrode pattern A1, B1, C1, D1, E1 is supplied to the disc 22 placed above the spring 21 and moveable with the stick 20. E1 is shown as a star pattern with radial arms extending from a central circular portion. The arms are not necessary in order to enable the arrangement to function in the intended manner, but they provide a greater electrode surface. FIG. 2A does not show the housing for the arrangement with the mounting of the various components but it is in principle the same as that shown in FIG. 1B.

The disc 23, which is provided with the conducting coating I, the voltage level of which is indicated by being fed to the (−)-input of a operation amplifier 25, is, in thix embodiment, fixed facing the moveable disc 22 with the conductive coating facing it. The second conducting coating G1 for the capacitor pair for indicating deviation in the z-direction is placed on an additional fixed disc 24 placed parallel with the disc 23. Displacement of the sensor tip in the z-direction is thus sensed with the aid of two capacitors, of which one G1/I has a constant capacitance and the other E1/I has a variable capacitance.

On its side opposite to the conducting coating I, the disc 23 has a ring R of a conducting coating. The ring R is coupled to the output of the amplifier 25 and thus the amplifier has a negative feed-back coupling with the capacitor which is formed between the coatings I and R on the disc 23, so that a signal varying about the "0"-signal level is obtained at the input to the amplifier 25. The sensor surface I should in an electrically normal position be approximately midway between the G1 and the E1 surfaces. The feed-back to R provides lower sensitivity to stray capacitances, since the sensor surface I is then always at earth potential as regards DC voltage.

As can be seen in FIG. 2B, in this case, the electrodes for the x- and y-deviation capacitors are fed with the same frequency f2 but with a relative phase displacement of 90°, i.e. they are supplied with the voltages $V_{f2}$ 0° and $V_{f2}$ 90°, respectively. The electrodes for the z-deviation capacitors are supplied with a voltage of twice this frequency, i.e. $V_{2f2}$. It should be noted that it is within the scope of the invention to instead supply the z-electrode pair with a voltage of half the frequency f2 or with some other multiple n of f2. Other variations with three frequencies for x, y and z are of course also considerable instead of two, where 0° and 90° are used for one frequency.

The output signal from the amplifier 25 is processed in a similar manner as that disclosed in connection with FIGS. 1A–1C. The output signals x, y and z are in this case simply filtered, analoque measuring signals, which in a known manner can be transformed to digital values to be sampled and data processed in a measuring computer connected thereto. This type of feed can also be used in the embodiment according to FIGS. 1A–1C, as the type of feed shown in that embodiment can also be used in the embodiment shown in FIGS. 2A and 2B.

Figure 3A:
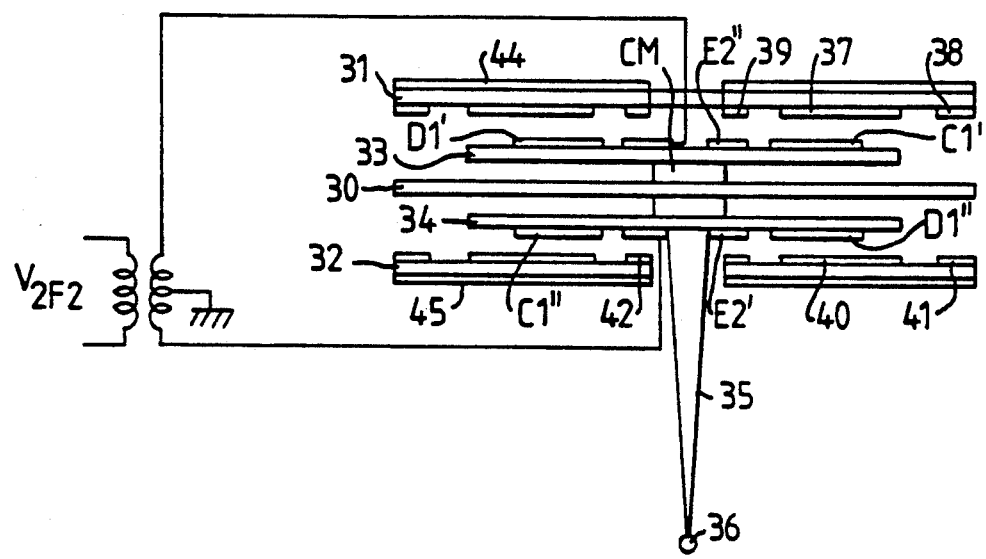
FIGS. 3A and 3B show a schematic assembly drawing and a circuit diagram for a third embodiment of the analogue sensor according to the invention.

FIG. 3A shows an embodiment of a measuring probe in accordance with the invention, which is symmetrical about the centre of movement CM of the probe, and which has balanced capacitance pairs for displacement indication in all three directions, x, y and z. The mounting means are not shown in this Figure for the stationary components, which are the spring 30 with essentially the same design as the spring 3 in FIG. 1A and the outermost discs 31 and 32. The intermediate discs 33 and 34 are rigidly joined to the stick 35 with its tip 36 and are moveable therewith angularly for the directions x, y and longitudinally for the z direction about the centre of movement CM. Each of the moveable discs 33 and 34 is provided on its side facing away from the spring 30 with a pattern which can have the form shown in FIG. 2B, with the exception that the electrode E1 is provided with a hole in the centre. This hole allows the stick 35 to be fixed to the anchoring means on the spring 30 and allows the patterns on the two discs 33 and 34 to be entirely identical.

The pattern segments for indicating deviations in the x- and y-directions, corresponding to the pattern segments A1, B1, C1, D1 in FIG. 2B, on the discs 33 and 34, are connected to each other, so that in FIG. 3A, the pattern segments C1' and C1" are coupled to each other, as are the pattern segments D1' and D1". Note that the pattern segments of the same type on discs 33 and 34 are arranged diametrically opposite to each other, so that a displacement in any direction acts in the same direction for the capacitors on either side of the spring 30. Assuming that the voltage supply to the electrode plates for indication of deviation in the x- and y-directions is the same as in FIG. 2B, a voltage $V_{2f2}$ is supplied for indicating deviation in the z-direction to the primary side of a transformer, the secondary side, with a grounded central output, is coupled between the pattern segments E2' and E2".

Figure 3B:
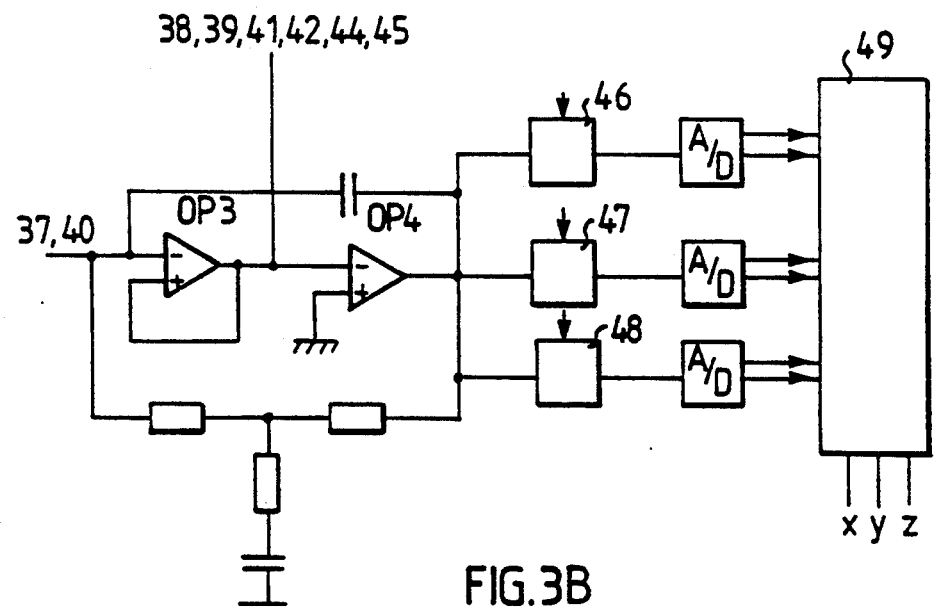

Each of the outer plates 31 and 32 has on its side facing one of the moveable plates three annular coatings, of which the radially intermediate one 37, 40, respectively, is widest and is coupled to the (+)-input of an operation amplifier OP3 as the sensor electrode (see FIG. 3B). The output of the amplifier OP3 is coupled to its (−)-input.

The outer 38 and 41, respectively, annular coating, and the inner 39 and 42, respectively, annular coating, as well as a complete coating 44 and 45, respectively, on the two discs 31 and 32, is coupled and bootstrapped to the output of the operation amplifier OP3. The output of the amplifier OP3 is coupled to the (−)-input of an operation amplifier OP4, the (+)-input of which is coupled to earth. The output of the amplifier OP4 is fed back to the (+)-input of the amplifier OP3, on one hand via a capacitor and on the other hand via a direct current feed-back without an alternating current feed-back as was shown in connection with FIG. 1B.

Furthermore, the output of the amplifier OP4 is coupled to three phase detectors 46, 47, 48 of the same type as shown in FIG. 2A with "phase pure detection", i.e. without phase shift, of the displacements in the three sensing directions. The low-pass filtered outputs from the phase detectors 46, 47, 48 are then after analogue/digital conversion in individual analogue/digital convertors A/D-coupled to the input of a microprocessor 49 with surrounding hardware such as a program memory and a operating memory, which is provided with a program to compute deviations in the sensing directions and send them to one or more outputs for connection to other equipment, such as a presentation unit or a unit which utilizes the signals obtained as control signal and the like (not shown).

Figure 4C:
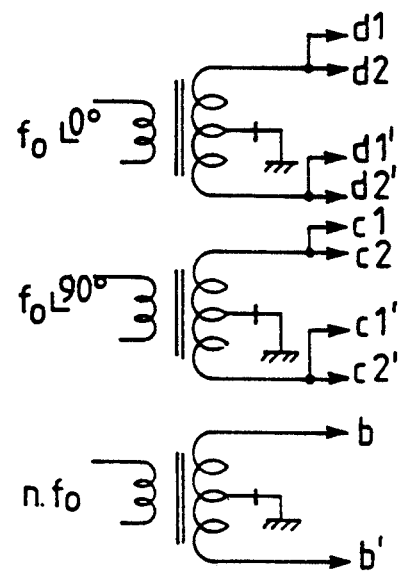

FIGS. 4A, 4B, 4C, and 4D show a forth embodiment of a device according to the invention. This embodiment is the preferred embodiment. FIG. 4A is a perspective view of the sensoring components placed farther from each other than in reality for the sake of clarity.

The sensor stick 51 with its sensor ball 52 is suspended in a spring 53 so that the point of support is centrally disposed permitting movement in the z-direction (axially to the stick), and angular movement relative to the z-axis about a point which can only move in the z-direction, as disclosed in the embodiments above.

A pair of electrically conducting collector plates 54 and 55 are permanently mounted on the stick and are insulated therefrom on either side of the spring 53. The collector plates are suitably of metal and are electrically connected to the spring 53.

The housing of the probe is not shown but can be of the same type as that shown in FIG. 1B. The spring 53 has peripheral outer tongues 56, 57 with which it is fixed in the cover.

Axially on either side of the collector plates 54 and 55, there are a pair of drive plates 58, 59 fixed in the probe housing, which plates are printed boards with conducting pattern segments on a substrate. The pattern on the printed boards is shown in FIG. 4B and also schematically in FIG. 4A. The patterns on the patern discs 58 and 59 are identical and the patterned surface on the discs face the collector plates 54 and 55. Similar pattern segments on the discs 58 and 59 are supplied with voltage in the same manner, so that the front pattern segment, as viewed in the FIG. c1′ on the disc 59, and the left hand pattern segment c2′ on the disc 59, and the left hand pattern segment, e.g. d1′ on the disc 58 corresponds to the right hand pattern segments d2′ on the disc 59, and vice versa (see FIG. 3A).

In FIG. 4B, the pattern segments on the disc 59 are labelled. These are placed in concentric rings. In the innermost ring, there is a windmill-vane like pattern segment b′ for indicating movement in the z-direction. As can be seen in FIG. 4C, a voltage with the frequency $n*f_0$ is applied between the pattern segment b on disc 58 and the pattern segment b′ on the disc 59. The signal shape can, as mentioned above, be a sine or some other form of edged wave. All of the radially extending parts of the pattern b′ are interconnected by an inner ring. The pattern segments a′ are placed between the extending portions of the pattern b′. The pattern segments a′ are connected to each other on the back side of the disc. The pattern segments a′ on the disc 59 form together with the collector plate 54 and the pattern segments a on the disc 58 together with the collector plate 54 a feed-back capacitor for the circuit shown in FIG. 4A.

Figure 4D:
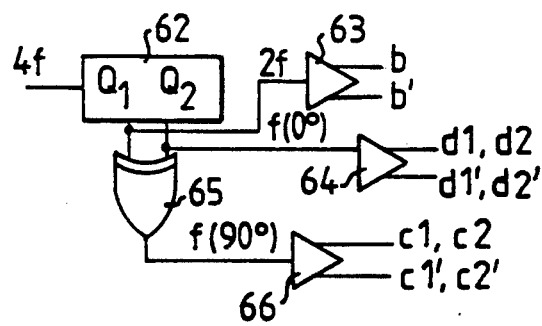

The ring outside the innermost ring has pattern segments c2, c2′ and d2, d2′ for indicating the movement of the measuring ball in the x- and y-directions, respectively. An alternating current is supplied with the frequency $f_0$ and the phase 0° between the pattern segments d2 and d2′, as well as between the pattern segments d1 and d1′ on the disc 58. Furthermore, an alternating current with the frequency $f_0$ and the phase 90° is supplied between the pattern segments c2 and c2′ as well as between the pattern segments c1 and c1′ on the disc 58. FIG. 4C shows that this voltage application can be effected via the transformers, as described above. FIG. 4D shows an alternative method of generating the drive signals. A frequency divider 62 is supplied with a signal with the frequency $4*f_0$. The frequency divider 62 has an output Q1 with a signal with the frequency $2*f$ and another output Q2 with a signal with the frequency f and the phase 0°. The Q1 output of the divider 62 is coupled to a first amplifier 63 with a non-inverted and an inverted output, of which one is coupled to the pattern segment b and the other to the pattern segment b′. The Q2 output of the frequency divider 62 is coupled to a second amplifier 64 with a non-inverted and an inverted output, one of which is coupled to the pattern segments d1 and d2 and the other to the pattern segments d1′ and d2′. The outputs Q1 and Q2 are also coupled to individual inputs of an exclusive OR-gate 65, at the output of which there is a signal with the frequency f, phase shifted 90° from the signal at the output Q2. This signal is fed to a third amplifier 66 with a non-inverted and an inverted output, of which one output is coupled to the pattern segments c1 and c2 and the other output is coupled to the pattern segments c1′ and c2′.

A protective ring r′ on the disc 59 and a protective ring r on the disc 58 are placed radially outermost and are coupled to the probe housing.

The collector plates 54 and 55 are electrically coupled to the spring 53, and the signal is suitably extracted via the spring 53 insulated from the probe housing. The collector signal is fed to the (+)-input on an operation amplifier 60, the (−)-input of which is coupled to its output. In order to eliminate short-circuiting random or stray capacitances around the collector plates, the surrounding probe housing, together with the protector rings r and r′, are bootstrapped to the output of the amplifier 60. The output of the amplifier 60 is coupled to the (−)-input of an operation amplifier 61, the output of which is coupled to phase demodulating circuits (not shown) for separating the information concerning the movement in the x-, y- and z-directions, in the same manner as is described above in connection with the preceding embodiments. The pattern segments a and a′ are coupled to the output of the amplifier 61, and the AC feed-back is effected by a composite capacitor between the segments a and the collector 55 and between the segments a′ and the collector 54. The DC feed-back is effected in the same manner as in the embodiments described above.

In order to make the measuring tip rapidly moveable, a simple force supplier can be connected to the sensor. The drive system of the force supplier must act on the ball of the measuring stick in the x-, y- and z-directions. By combining the capacitive sensor and an inductive force supplier, a single combination unit can be simply produced. A certain reduction of the measuring accuracy is, however, connected therewith, since the force supply and the measurement are coupled, but the advantage of rapid mobility outweighs the disadvantages in most cases. The possibility of shutting off the force supply portion can be provided with a switch.

An inductive force supplier coupled to a capacitive sensor of the type shorn in FIG. 4A is shown in FIG. 5A. It is however obvious that any of the sensor embodiments shown can be used here. The collector plates 71 and 72 are rigidly and electrically connected to the spring 73. The spring 73 is mounted between and electrically insulated from by insulating rings 74 and 75, to annular holder members 76 and 77. The pattern plates 78 and 79 are mounted in grooves in individual holder members 76 and 77, respectively, which are preferably of metal, and are boot-strapped to the output of the amplifier 60 (see FIG. 4A).

The stick 80 rigidly joined to the capacitor plates 71 and 72 extends through the unit 71-73 with an extra portion 81, which is fixed to a force supplier.

The force supplier according to FIG. 5A comprises a cup-shaped element 82 of insulating material opening away from the sensor and provided with an annular, outwardly extending curved flange 83.

The centre of curvature of the flange 83 lies approximately at the centre of movement CM' of the sensor. The two sides of the cup-shaped element 82 are provided with a loud speaker winding 84, and the flange is provided with windings L1-L4. The entire unit 82, 83 is moveable, and fixed magnetic fields cross the windings. The cup-shaped element 82 with its winding 84 acts as a loud speaker coil.

The four windings L1, L2, L3, L4 are arranged in a square (see FIG. 5B) on the annular laminate disc 83, so as to form four distinct poles, two of which, L1, L3 are placed along the x-axis and two, L2, L4 along the y-axis. The windings in or on the laminate are produced, for example, by multi-layering or by comressing the wound "square" coils and embedding them. The propagation of the vertical magnetic fields M1, M2, M3, M4 laterally through the disc 83 is shown in FIG. 5B and is displaced relative to the coils L1-L4, whereby a current carrying coil tends to be pulled farther into the field, if the magnetization direction is opposite to that of the field; otherwise it is repelled.

The approximately vertical and horizontal magnetic fields shown in FIG. 5A are produced by an arrangement of permanent magnets and soft iron elements. A bar-shaped permanent magnet 86 is placed in the opening of the cup-shaped element 82 above the winding 84. Soft magnetic bars 87 and 88 are fixed on either side of the magnet 86. An annular unit 89 provided with four permanent magnets and with its magnetization transverse to the axis of the stick 80, when it is in its normal position, is placed about the soft magnetic bar 88. An annular pole shoe 90 with at least soft magnetic parts in connection to the permanent magnets is placed about the ring 89. An additional ring 91 with soft magnetic parts 10 placed opposite the ring 90 on the other side of the flange or collar 83. The surfaces facing the collar on the rings 90 and 91 have essentially the same curve shape as the collar. The collar 83 is in its normal position parallel to the surfaces. The magnetic lines have been drawn in the left hand portion of FIG. 5A. The sensor portion is insulated from the force supplier portion by the stationary soft iron ring 91 of the force supplier being placed in an inner cavity in an annular insulating jacket 92 glued to the holder element 76.

By supplying the windings L1-L4 and 84 with suitable signals, a movement of the measuring stick can be controlled in the x-, y- and z-directions as desired.

By supplying current to the x-windings L1, L3 or y-windings L2, L4, a force is obtained in the corresponding direction. The z-winding 84 is a variant of a loud speaker coil for generating force in the z-direction.

The supply of current to each individual winding can take place, for example, as soon as the output signal from the micro-processor 49 in FIG. 3B has been received, which gives the deviation for which the winding is to provide force in its respective direction. The force provider can, however, be used to provide a presetting for the measuring ball in a measuring process, which will be described in more detail below.

Figure 6:
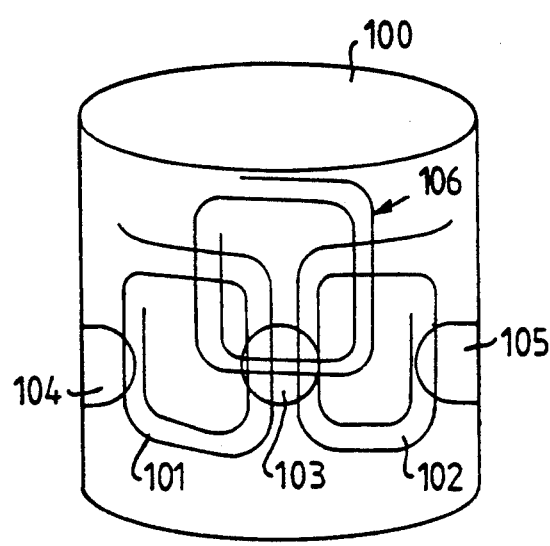
FIG. 6 shows an embodiment of a component in a force supplier for the sensor.

Many variations of the coils and laminates can be conceived to provide a corresponding function to the force provider in FIG. 5A. In FIG. 6, an example is shown of a cage winding arrangement on a coil frame 100, which provides x-, y- and z-forces directly for the coil frame, so that no laminate collar 83 with windings in required. The magnet arrangement can in this case consist of an inner cylinder provided with permanent magnets and an outer ring provided with permanent magnets with a connecting soft magnetic pole shoe above the coil frame 100 (not shown), so arranged that relatively narrow magnetic fields 103, 104, 105 extends through the frame 100.

The cage winding arrangement comprises in the embodiment shown four spiral windings 101 and 102 (only two are visible in the Figure) for providing force in the x- and y-directions, and distributed about the circumference of the coil frame and at the same level. They are placed so that the magnetic field lines through the coil frame, which lines have the relatively small lateral propagation as shown in the surfaces 103, 104, 105, will be evenly divided between each two of the spiral windings 101, 102.

When extra force is to be applied in the y-direction, for example to the right in the Figure, the windings 101 and 102 are supplied with current in such directions that one coil is attracted farther into the magnetic field 103, and the other is repelled from the magnetic field. The same type of current supply is made to the windings on the other side of the coil frame 100, so that no movement occurs in the direction of the magnetic field. When forces are to be applied in the x-direction, e.g. transversely to the plane of the paper, the winding 102 and the winding adjacent thereto (not shown) on the other side of the coil frame are supplied with current in such directions that one is tended to be pulled into the magnetic field 105 and the other to be repelled. The same type of current supply is effected for the winding 101 and its adjacent winding on the other side of the coil frame, so that the force is supplied in the same direction along the x-axis.

There are also spiral windings 106 at a level above the windings 101, 102, so that their lower portion is struck by the magnetic fields 103, to provide a force in the z-direction. The windings 106 need only be two in number, as in the Figure, one on either side of the coil frame 100, but they can also be more numerous, e.g. four symmetrically placed about the coil frame. What is essential here is that the windings 106 lie somewhat displaced relative to the magnetic field passage 103, and therefore they can also be placed alternatively or supplementary at a level below the windings 101, 102. To provide extra force upwards, the windings 106 are provided with a current with a current direction which provides repellance in the magnetic field 103, and in the opposite magnetic field on the other side of the coil frame 100, and for extra force downwards with a current supplied in a direction which provides attraction.

Figure 7A:
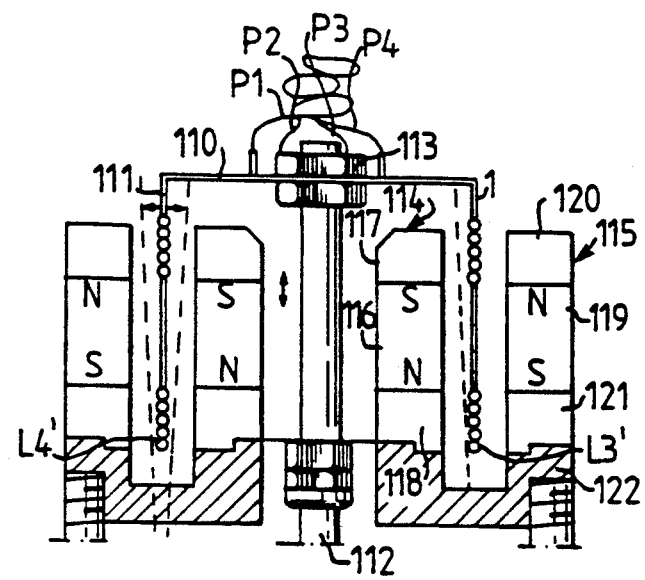
FIGS. 7A, 7B and 7C show a section through another embodiment of a force supplier for the sensor, a circuit diagram of a circuit for feeding the windings in the energizer, and a view from above of the force supplier in FIG. 7A, FIGS. 8A, 8B and 8C show plan views from various directions of an additional embodiment of a force supplier for a sensor according to the invention.
Figure 7B:
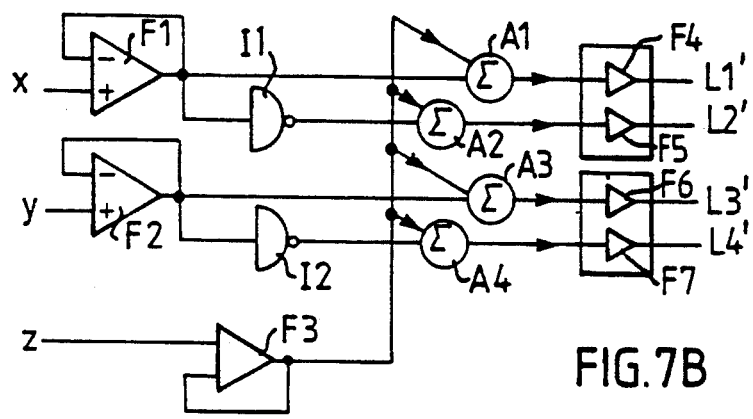
Figure 7C:
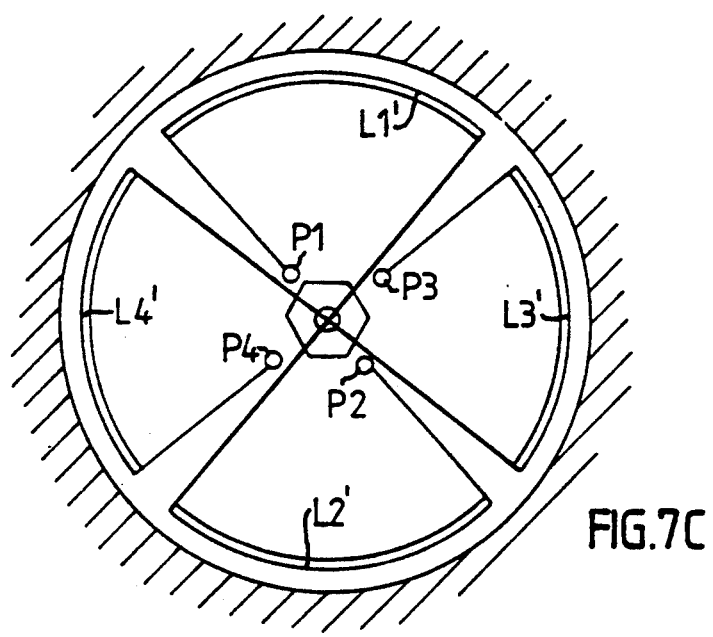

FIGS. 7A, 7B and 7C show an additional embodiment of a force supplier for the sensor, where a cup-shaped element 110 has its cylindrical portion 111 provided with four windings L1', L2', L3', L4'. The cylindrical portion 111 has its bottom at the top of the Figure and its opening at the bottom of the Figure. The stick joined to the central portion (not shown) thus extends centrally through the cylindrical portion 111 and is fixed to the bottom 110 by means of a screw fastener 113. A double magnet-equipped cylinder has an inner cylinder portion 114 and an outer cylinder portion 115, which portions are placed on either side of the cylindrical portion 111 of the cup-shaped element 110. The inner cylinder 114 has a cylindrical permanent magnet 116, which is surrounded in the axial direction by two annular pole shoes 117, 118 of soft iron. The outer cylinder 115 has a cylindrical permanent magnet 119, which is surrounded in the axial direction by two annular pole shoes 120, 121 of soft iron. The axially polarized magnets 116 and 119 have their poles oppositely oriented, so that magnetic lines between their respective North and South poles, with the aid of the pole shoes, will extend essentially across the air gap between the diametrically opposed winding portions of the windings L1'-L4'. The magnet-equipped cylinders 114 and 115 are held in a holder 122, which is securely screwed into the casing for the sensor portion, and which provides insulation between the sensor portion and the drive system. The holder is provided with a central hole of the same diameter of the magnet cylinder 114. This diameter is essentially greater than the diameter of the stick 112, so that it can move freely under the influence of the drive system and due to displacements of the measuring ball. As in all of the embodiments of the invention shown, the stick is made of electrically insulating material, e.g. a ceramic material.

FIG. 7B shows a circuit diagram for driving the drive unit in FIG. 7A. Signals for the desired pre-positioning in the x-, y- and z-directions are coupled to individual amplifiers F1, F2 and F3, respectively.

The output signal from amplifier F1, to which the x-signal is supplied, is sent, on the one hand, via a first adder A1 to a further amplifier F4, and, on the other hand, via an inverter I1 and a second adder A2 to an amplifier F5 matched to the amplifier F4. The signal for pre-positioning in the x-direction is fed from the amplifier F4 to the winding L1' and from the amplifier F5 to the winding L2', whereby these windings are driven in opposite directions so that their movements in the magnetic field from the magnet cylinders in the x-direction cooperate with each other.

The output signal from the amplifier F2, to which the y-signal is supplied, is sent, on the one hand, via an adder A3 to an additional amplifier F6, and, on the other hand, via an inverter I2 and a second adder A4 to an amplifier F7 matched to the amplifier F6. The signal for pre-positioning in the y-direction is fed from the amplifier F6 to the winding L3' and from the amplifier F7 to the winding L4', whereby these windings are driven in opposite directions so that their movements in the y-direction in the magnetic field from the magnet cylinders cooperate with each other.

The output signal from the amplifier F3, to which the z-signal is supplied, is fed to the four adders A1, A2, A3 and A4. The four windings L1', L2', L3', and L4' are fed with z-signals, which drive the windings in the same direction in the z-direction, so that they do not deviate in the x- or y-direction due to these signals, but instead are pulled in or out of the magnetic field between the magnet cylinders, and are thus displaced upwards or downwards in FIG. 7A. The windings are fed with signals from the circuit in FIG. 7A at the connections P1, P2, P3 and P4 to the respective windings L1', L2', L3', and L4'.

Figure 8A:
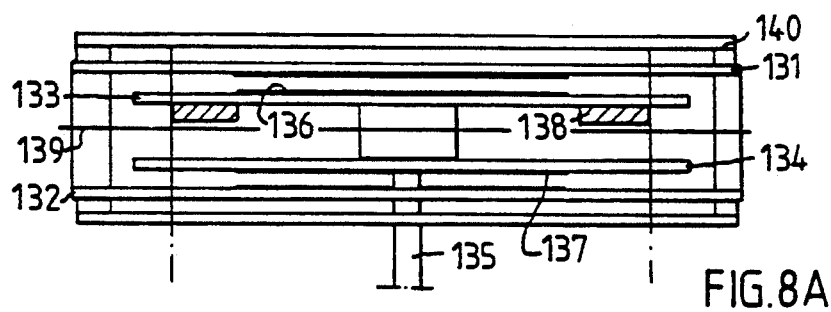
Figure 8B:
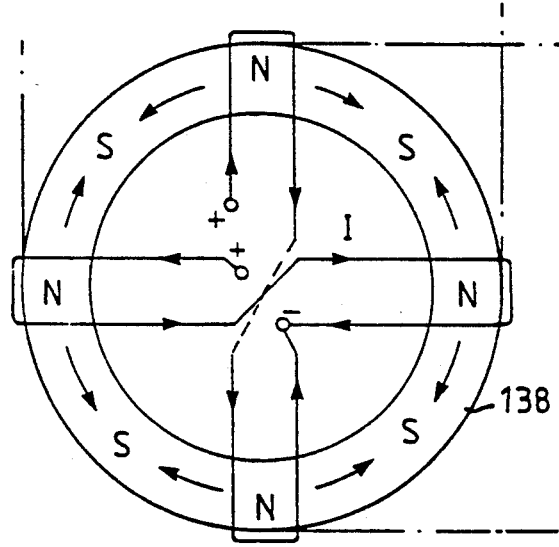
Figure 8C:
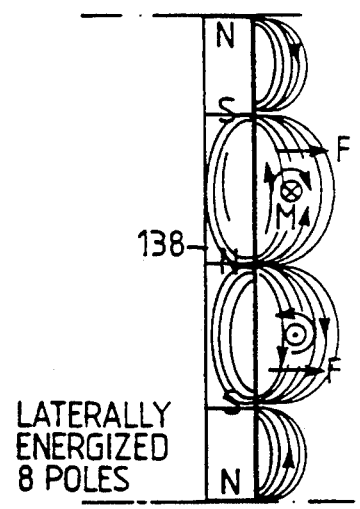

FIGS. 8A, 8B, 8C show an embodiment of a sensor with a force supplier, where the elements for both the sensor and the force supplier are placed on the same discs, i.e. the sensor and the force supplier are not two rigidly mechanically connected separate units.

The sensor portion can, for example, have the electronic design described in connection with FIGS. 4A-4D. The circuits for driving, which are shown on the plates 58 anbd 59 in FIG. 4A, are placed on the stationary plates 131 and 132 and the collector plates 54 and 55 in FIG. 4A as conducting layers 136 and 137, respectively, on the discs 133 and 134, which are moveable but which are rigidly joined to the measuring stick 135, which discs 133 and 134 are placed on either side of the spring 139. The conducting pattern and the collector layers are placed here in a central portion of the disc, so that the periphery is left free.

The active portion of the force supplier is placed on the periphery of the discs and, as can be seen in FIGS. 8B and 8C, it consists of an annular, thin, laterally magnetized, eight-pole magnetic unit 13B, which is placed on one 133 of the moveable discs.

On the stationary discs 131 and 132, suitably on the opposite side to the sensor drive pattern, are windings with essentially the same configuration as is shown in FIG. 8B. For the sake of clarity, the Figure only shows one winding turn for each winding portion, but it is obvious that each winding portion has a plurality of turns. The force lines for the magnet and winding arrangement are shown in FIG. 8C. Depending on the control of the windings on either side of the magnetic unit 138, movement can be obtained in the three cartesian coordinate directions. It is obvious that ring magnets can instead be placed on the stationary discs 131 and 132, and the windings in this case be placed on the discs 133 and 134.

The sensor circuits for the sensor portion and the control circuits for the force portion are suitably placed on a stationary controller plane 140.

Figure 9A:
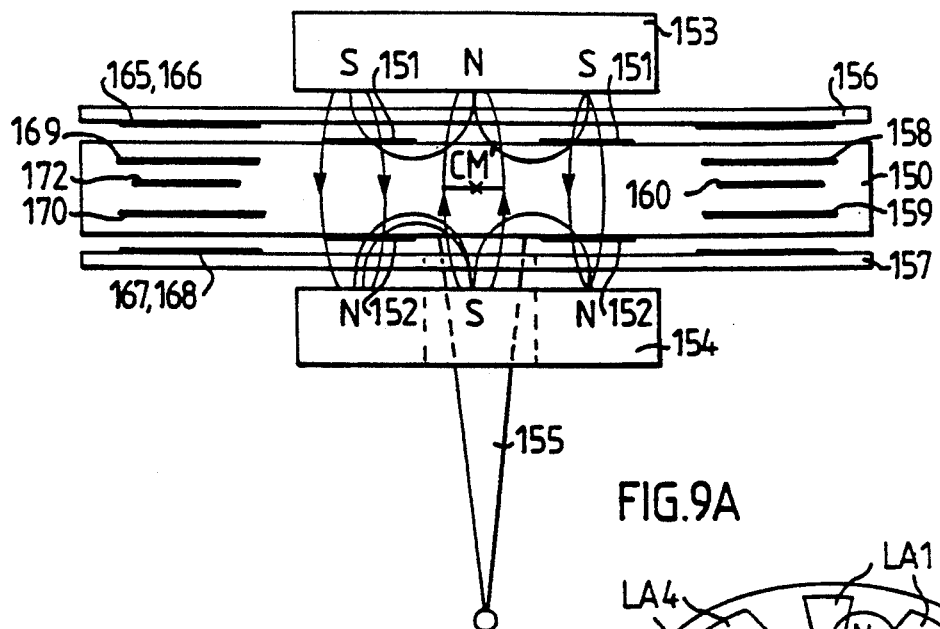
FIGS. 9A and 9B show schematically a side view of a free-floating sensor with force supplier and a schematic indication of the winding arrangement for the force supplier and the extent of the magnetic fields relative to the windings.
Figure 9B:
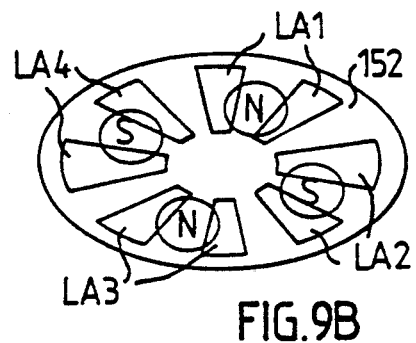

FIG. 9A shows an embodiment with both sensor and force supplier but with only one moveable laminate plate 150. This provides a free floating measuring system with sensor and force supplier in one-laminate. The laminate plate is thus not fixed in a spring system but is kept hovering with the aid of the force system. The displacement sensor according to FIG. 9A is symmetric about a central point CM' in the centre of the disc 150. The force supplier arrangement has windings 151, 152 on either side of the plate 150, made in the manner shown in FIG. 9B. On either side of the disc 150 are two stationary magnetic discs 153, 154 of, for example, BaFe, magnetized along their circumferences with alternating South and North poles, two of each and cooperating with the windings.

When each winding arrangement, LA1, LA3 and LA2, LA4, respectively, each including two opposite winding arrangements, is fed with current, which provides differently directed magnetic fields in the two winding arrangements, an angular force is provided displacing the ball on the stick 155 in the x- or y-direction, and when they are provided with current which, for the winding arrangements, provides the same direction of their magnetic fields, a force is provided in the z-direction, and so that they attract or repel adjacent magnets depending on in which direction the force is to be provided.

By producing the laminate or disc relatively thick with cast coils and using the horizontal magnetic field between the poles through the laminate, two force generations can thus be provided. It is then, for example, possible to provide force in the x/y-direction at the upper portion of the disc 150, and in the z-direction at its lower portion. Three coil systems provide three degrees of freedom in accordance with FIGS. 9A and 9B (two areas on the upper surface of the disc provide force in the y- and x-directions, respectively, and four areas on its underside in the z-direction).

The stick with its measuring tip is fixed in the laminate disc 150, which is free hovering moveably placed between the stationary magnetic discs 153, 154.

On either side of the disc 150, between the disc 150 and one of the magnetic discs 153, 154, there is a stationary disc 156, 157, respectively. The sensor capacitors have in this embodiment their various electrodes placed, on the one hand, on the discs 156 and 157, and, on the other hand, at different levels 158, 159, 160 inside the disc 150. The various electrodes are preferably placed so that they are not in any essential degree affected by the electrical and magnetic fields of the force supply arrangement. In the embodiment shown, the force arrangement is placed centrally and the sensor arrangement radially outside it.

Figure 10A:
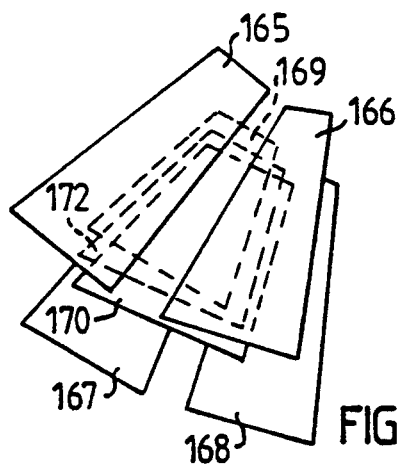
FIGS. 10A, 10B, 10C, 10D show different parts of and a circuit diagram for the embodiment shown in FIGS. 9A and 9B according to the invention.
Figure 10B:
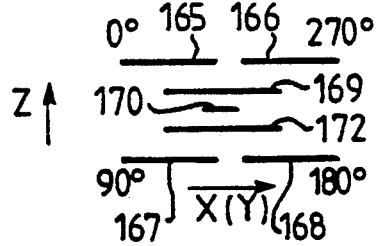

An embodiment of the electrode arrangement of the sensor portion is shown in FIGS. 10A, 10B, 10C and 10D, which show an embodiment where six quantities are measured, namely translational movement in x-, y- and z-directions, and rotation $q_x$, $q_y$ and $q_z$ about the respective coordinate axes. FIG. 10A shows a forth of the electrode plate arrangement in perspective. FIG. 10B shows it from the side. The electrode plates 165–168, which are supplied with alternating current, are placed on the stationary discs 156 and 157 in FIG. 9A. As can be seen in the upper part of FIG. 10D, the electrode plates 169, 170 serving as sensor electrodes, are interconnected and coupled to the (−)-input of an operation amplifier 171, placed inside the moveable disc 150, one directly underneath the other, at the various levels 158, 159 (FIG. 9A). In the central plane 160 of the disc 150, there is an additional electrode disc 172, which can be annular and which is coupled to the output of the amplifier 171 to provide a feed-back capacitance.

Figure 10C:
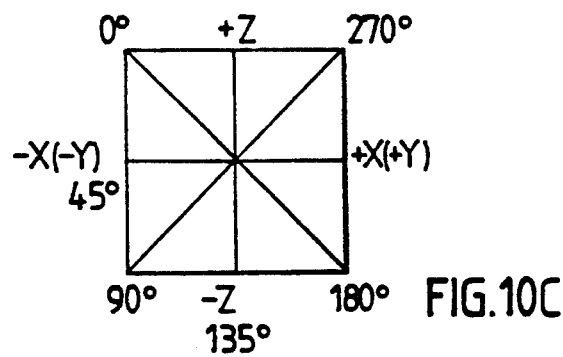
Figure 10D:
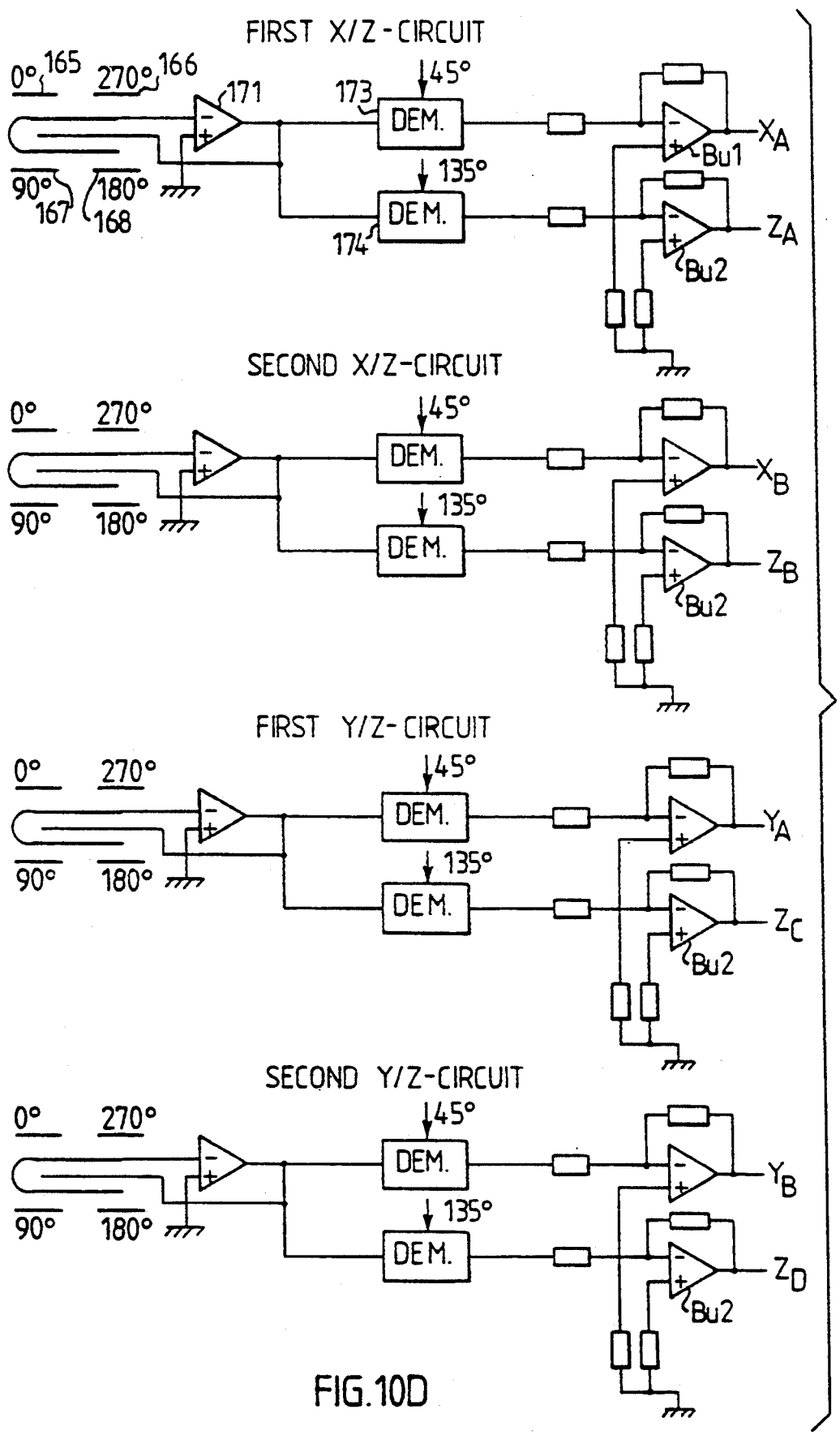

The plates 165, 166, 167, 168 in the sensor are supplied with alternating current relative to earth as shown in FIGS. 10B and 10D (top). The alternating current of the different plates is phase shifted in 90° increments, i.e. 0°, 90°, 180°, 270°. FIG. 10C shows a direction diagram for sensing. Thus, readings are obtained on the detector plates as shown in FIG. 10C, i.e. sensitivity in two directions by detecting without phase-shift at 45° and 135°, as shown in FIG. 10D.

Two opposing arrangements of the type shown in FIG. 10A provide angular deviations in the x-direction and two opposing arrangements perpendicular thereto provide angular deviations in the y-direction. All four arrangements are separately supplied, as shown by the four circuits in FIG. 10D. Here it is possible to select either having the same frequency for the supply voltages to the circuits, or different supply voltages. As can be seen in the uppermost ciructit of FIG. 10D, the modulation is accomplished with square wave reference signals having 90° phase displacement (45° and 135°) to the phase detectors 171 and 174 coupled to the output of the operation amplifier 171 in the same manner as is described above. The signals from the phase detectors are fed through individual buffer amplifiers Bu1 and Bu2. If the uppermost circuit shown in FIG. 10D is now coupled to an electroplate arrangement for indicating the x-direction, the output signal U1 of the phase detector 174 reveals movement perpendicular to the x-direction, i.e. in the z-direction, while the other output signal UZ of the phase detector 173 reveals movement in the x-direction.

FIG. 10D shows the four movement indicating circuits, each connected to an individual plate arrangement of the type shown in FIGS. 10A and 10B. As mentioned above, the arrangement shown in this embodiment is to indicate seven different deviations from a normal position. As shown in FIG. 10D, eight output signals are obtained, which directly or in combination with each other provide the various deviations, which means that the system will be over-defined, which is not in any way a disadvantage. Rotation about the y-axis is obtained by using the difference between the output signals $z_C$ and $z_D$, rotation about the x-axis by using the difference between the output signals $Z_C$ and $z_D$, and rotation about the z-axis by a combination of $x_A$, $x_B$, $y_A$ and $y_B$. Pure movement in the x-direction is obtained by either $x_A$ or $x_B$, and in the y-direction by otherwise $y_A$ or $y_B$, and in the z-direction by $z_A$, $z_B$, $z_C$ or $z_D$. If the deviation from the normal position is a mixture of various directions and rotations, the calculations of the various deviation components are relatively complicated. The output signals from the circuits in FIG. 10D are therefore fed into a computer (not shown), which performs the calculations and presents the six derivable quantities.

In a measuring machine with a moveable measuring probe, one of the problems is obtaining high measuring speed and still preserving high accuracy. It is necessary to stop the movement of the measuring beam of the coordinate measuring machine in a position which is as central as possible relative to the central sensing area of the measuring probe.

This can be accomplished either by low speed of the measuring beam or by allowing higher speed and overswing, i.e. return of the measuring stick after it has passed beyond the measuring range in question to obtain high measuring accuracy. The dynamic forces, if there is a short braking distance, disturb the measuring accuracy.

Often, the speed cannot be chosen higher than a certain top speed in view of safety considerations.

By using a force supplier in a probe to provide a setting function where the position can be determined as to direction and dimension and displace the measuring tip of the probe forward in the direction of movement, it is possible to allow a higher measuring speed than previously, at the same time as one avoids overswing of the measuring stick and fulfills safety requirements.

Figure 11:
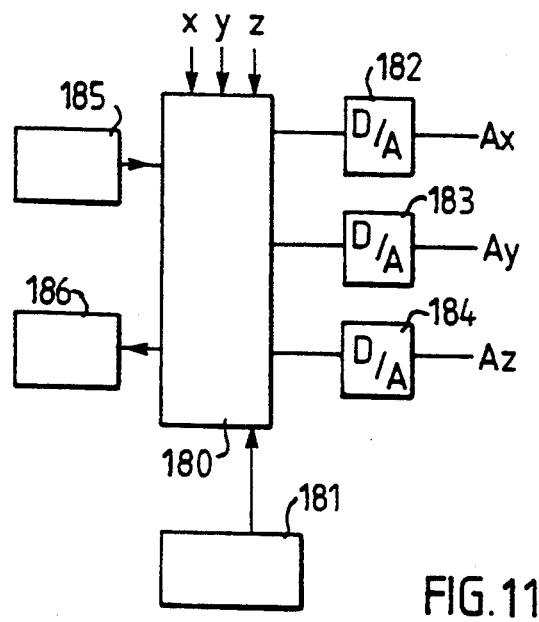
FIG. 11 shows a block diagram of a control arrangement for an embodiment of the sensor according to the invention.

The processor 180 in FIG. 11 can in such a case have an input coupled to a unit 185, which provides a digital output signal concerning the direction of movement of the measuring beam of a coordinate measuring machine. The processor 180 can either be provided with a program via an outer control unit 181 or, if this possibility is to be permanently built into the probe, it can be provided with a program which computes the current $A_x$, $A_y$, $A_z$, to be fed to the respective windings of the force supplier in order to lead the tip of the probe so displaced in the direction of movement that the braking distance is in principle doubled for "emergency stop". The maximum speed can thereby be increased for the same braking force because of the doubled braking distance.

For measuring purposes, since the point of contact is in principle known, the speed can be optimized for the braking distance to the "O"-position or be adapted so that measurement is taken at a certain constant speed when the "O"-position is passed, thus creating a minimum error in the output signal of the analogue measuring probe. All of this is computed by the processor 180 with the aid of dedicated programs. The processor, in addition to the supply of current $A_x$, $A_y$, $A_z$ to the windings of the force supplier, also of course controls a control unit 186 for the measuring beam. The control unit can be provided with signals varying the speed of the measuring beam in the different directions as conditions dictate. As soon as the measuring probe strikes an obstacle in the movement direction, this is indicated by a change in one or more of the input signals x, y, z to the microprocessor 180, which computes a specific output signal to the unit 186 and thus specific output signals $A_x$, $A_y$, $A_z$, in order for the measuring beam to come to a halt in the vicinity of the sensed obstacle, and so that the probe when it is has reached it will be placed in its normal position.

If the position and appearance of the measured object are known in principle, the measuring beam can be controlled to move at high speed to a position in the vicinity of the object and then be controlled to move at a speed adapted so that the measuring beam can be brought to a halt at the moment the probe strikes the measured object over a distance which corresponds to the deflection of the probe in the direction of movement. The force supplier is also controlled to assume a neutral position for the probe.

Since it is possible to move the measuring probe in the desired direction, this can be used for special types of measurements. The processor 180 makes possible various types of computations to control the force supplier of the probe, and this can of course be used by feeding in various types of programs into the processor from the unit 181.

It is possible, for example, to drop the probe in a hole and measure the shape of the hole by controlling the angular deviation of the probe in a rotating movement and by sensing, with the sensor portion of the probe, at what angles of deviation in different horizontal positions, the tip of the probe makes contact with the walls of the hole.

It is possible to provide a sensor with a feed-back via the force supplier, which is given hard resistance in one direction, e.g. the x-direction, but which is soft in another direction, e.g. the y-direction. This is achieved by feeding back the x-measured signal with a negative sign to the x-force supplier, while the y-measured signal is fed back with a positive sign or not at all. This property is valuable should one need to scan a probe over a surface along given lines. It is of course also possible to have a varying resistant force (elasticity ellipsoid) by having a differing degree of feed-back in the x-, y- and z-directions. The degree of feed-back can also vary in accordance with the degree of deviation from the normal position, so that information concerning the position is used as a reinforcing correction in the current amplifier to the force supplier.

The force supplier can also be compensated, by computation in the processor, for non-linearity of the returning spring 30 (FIG. 3A) or the spring arrangement. The various computer programs and algorithms for achieving the above described controls are easy to achieve for a programmer on the basis of the information given, and are therefore not described in more detail here. Compensations can, for example, be achieved by making comparative measurements in reference to a reference probe and storing the compensation values thus obtained in a permanent memory.

There is a type of known optical measuring machine which measures on a x,y-table which moves laterally, where the optics focus in the z-direction. This is, for example, the principle for the VIDICOM apparatus marketed by OGP. The disadvantage of this type of measuring machine is that it is not possible to make mechanical measurements. Certain machines are therefore provided with a probe along the z-axis, which is a good solution (combination machines).

Figure 12:
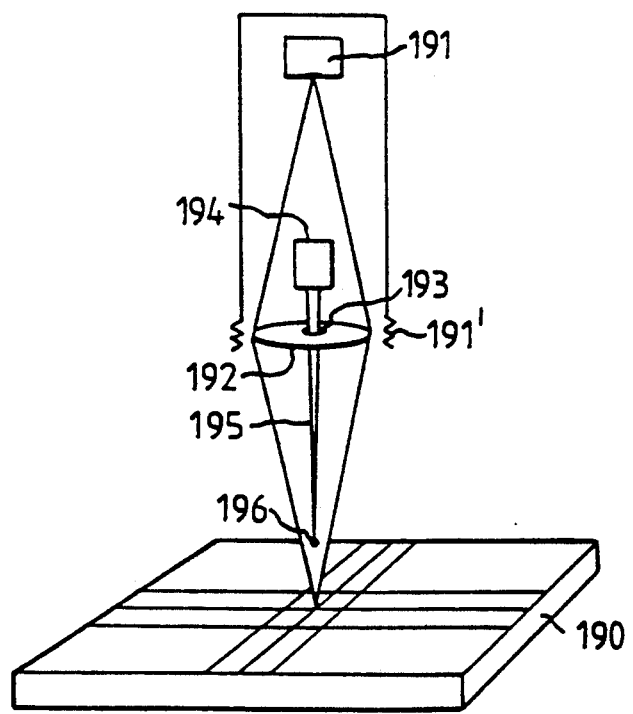
FIGS. 12, 13, 14, 15 and 16 show various embodiments of a sensor together with an optical measuring arrangement.

FIG. 12 shows the use of a probe according to the invention together with an optical measuring device, which reads the distance to an x,y-table 190 by focusing with a lens 192 against the x,y-table a beam from a simple laser distance measuring head 191 having a simple focusing adjustment of the type to be found in certain cameras. Focusing utilizes primarily the peripheral rays of the beam, and this provides a sharper focusing than the only slightly inclined central rays. Focusing can be adjusted by means of a lens holder portion 191', which can be moved in the z-direction.

According to an extra embodiment of the invention, the focusing lens 192 can be provided with a central throughhole 193 and a probe 194 of the type described above displaced so that the stick 195 with the measuring tip 196 passes through the hole 193. Thus, the probe 194 is placed centrally in the optical measuring means without standing in the way of the focusing operation. The probe can be lowered to provide mechanical measurement with the aid of a drive unit (not shown), which provides an accurately determinable distance relative to the laser distance measuring head 191. Such drive units are well known in the field and therefore need not be described in more detail here. Since the distance between the measuring tip 196 and the probe head 194 as well as between the probe head 194 and the distance measuring head 191 are known, the focal point can be determined accurately, and the mechanical measurement and adjustment of the focusing point will be quite accurate, when the mechanical measurement is accomplished by lowering the probe 194. The accurate measuring result can also be used to calibrate the optical distance measuring apparatus, thus increasing the accuracy of any subsequent no-contact measurement with the optical unit 191 alone and with the mechanical probe 194–196 in its raised position.

Figure 13:
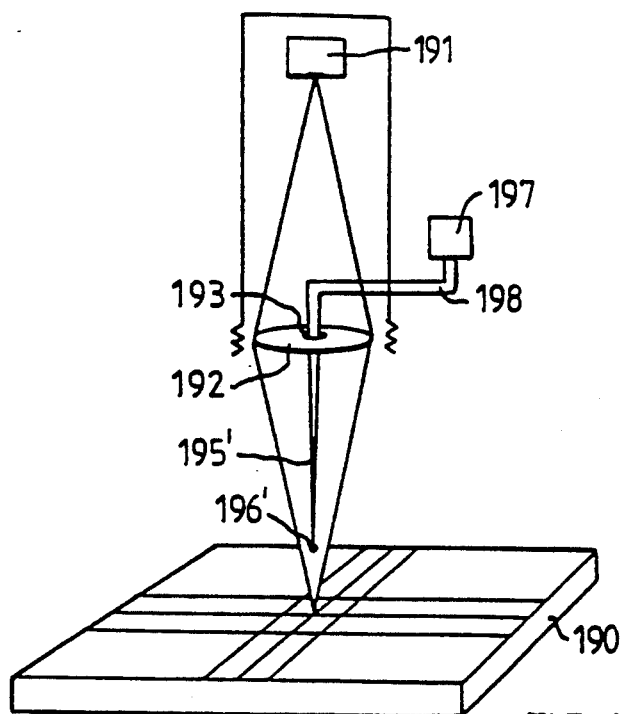

The combination arrangement with an optical measuring device can be made in a number of variants. In FIG. 13, there is shown the head 197 of the probe placed outside the light beam from the unit 191 and provided with a bent measuring stick 198, which connects to the stick portion 195' running along the z-axis through the central hole 193 in the lens, said stick having the measuring ball 196' at its end.

Figure 14:
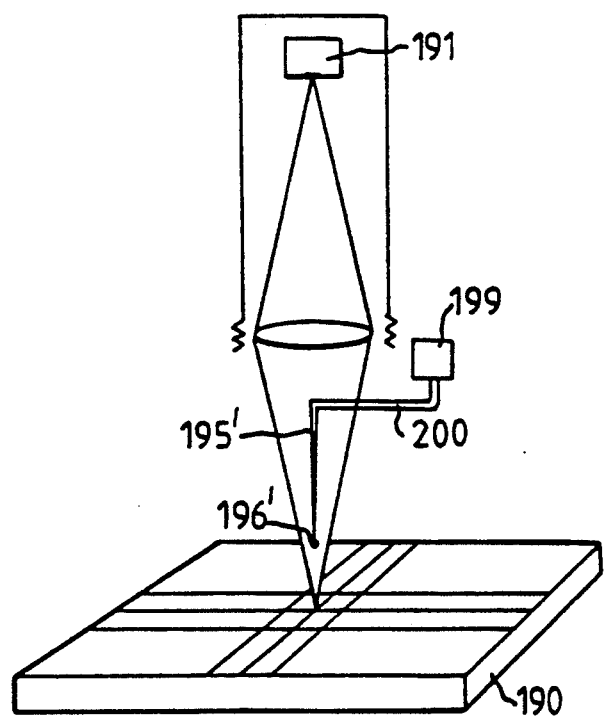
Figure 15:
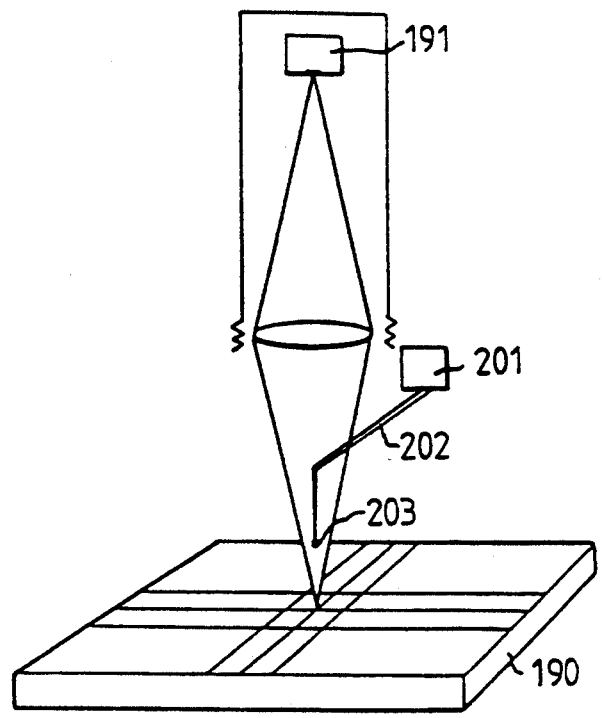

FIG. 14 shows a probe head 199 placed beside the optical measuring arrangement and having a curved sensor stick 200 with an axial portion 195" placed under the lens and being equipped with a measuring ball 196". FIG. 15 shows that the probe head 201 placed to the side can also be joined to the measuring ball 203 by an inclined bent stick 202. The inclined stick can also have a measuring ball directly at its end (not shown).

Figure 16:
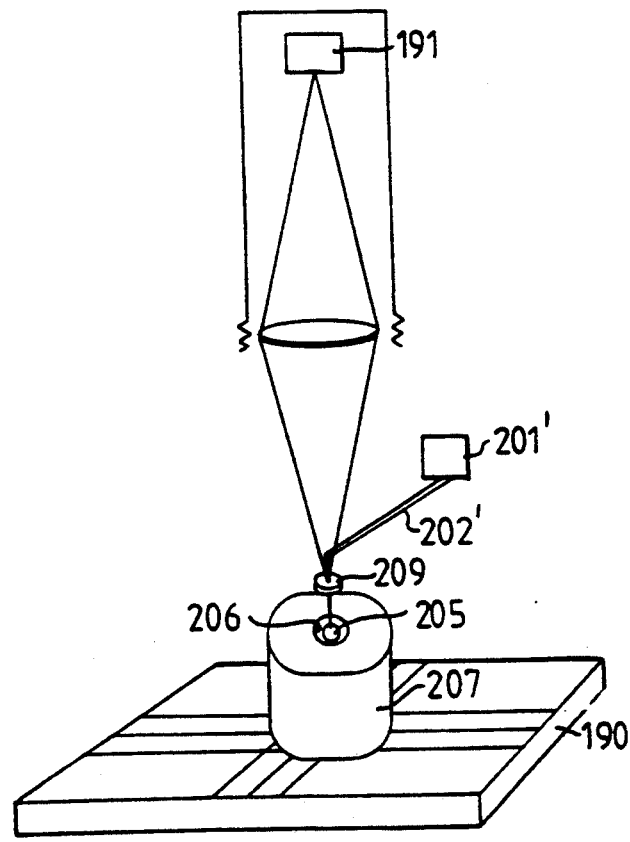

It could sometimes be convenient to be able to have the reference measurement of the optical measuring device made from a particular measurement on an object 207 to be measured, such as a measurement outgoing from having the ball 205 placed at a particular place in a hole 206 in the object or the like. The size of the hole is measured by making use of a sensor having a force supplier, and then a no-contact measuring using the optical measuring device is provided for the rest of the object 207. FIG. 16 shows an embodiment in which the probe stick 202' has a disk 209 on a part of it extending along the optical axis of the optical measuring device. The reference measurement of the optical measuring device is made towards the disk 209. The distance between the disk 209 and the measuring ball 205 is well-known. This embodiment is quite useful even if the reference measurement is to take place against the measuring table as in FIGS. 12 to 15, because the ball has some size and can not be seated at the measuring target at the same time as the measuring towards it is made by the optical measuring device. The measuring towards the disk 209 can be made when the ball 205 is placed on the target. For further measurings using the optical measuring device only, the mechanical measuring probe 201', 202', 205 is lifted up vertically in such an extent that the ball is not interfearing with the peripheral rays of the laser distance measuring head 191.

It is to be noted that the embodiments shown in FIGS. 12 to 16 may also be used having a mechanical measuring probe of a conventional type.

It is, within the scope of the invention, also possible for the force supplier to use the drive system as a dynamic dampening device for the measuring stick by having short-circuited windings. For this purpose, one can have a conducting cylinder mechanically joined to the moveable stick and placed in a magnetic field. Different supply frequencies but in different phases can, for example, be used to supply the different capacitors, also for indication of the same directions.

I claim:

1. A sensor for sensing displacement of a measuring tip which contacts an obstacle comprising:
    a) a mechanical sensing unit including a stick having said measuring tip at one end thereof;
    b) suspension means in said mechanical sensing unit suspending said stick to permit angular motion in relation to an axis of said sensor in several angular directions around said axis and about a central point, and to permit axial motion along said axis of the sensor, in order to permit motion detection in three dimensions;
    c) means to force said stick towards a position which represents a neutral position for said measuring tip in response to a force which displaces said measuring tip;
    d) sensing means including a part movable with said stick and a stationary part for angular sensing of the direction and size of a displacement of said sensor tip from said neutral position acting in a plane perpendicular to said symmetry axis of the sensor;
    e) said sensing means being adapted to sense direction and size of displacements in the axial direction from said neutral position as well as said angular displacement sensing.

2. A sensor according to claim 1, wherein said suspension means is a resilient force means which provides substantially the same counteracting force in all of said deviation directions to be measured.

3. A sensor according to claim 1, wherein said suspension means provides a freely hovering suspension, which includes means for lifting said mechanical sensing unit.

4. A sensor according to claim 1, wherein said means to force said stick towards said neutral position includes:
    a) a first force supplier portion joined to the movable sensing part of the sensor;
    b) a second force supplier portion joined to the stationary sensing part of the sensor, forming with said first force supplier portion a force supplying arrangement; and,
    c) control means providing electrical control signals to said force supplying arrangement to predisplace said sensor.

5. A sensor according to claim 4, wherein said control means receives signals indicating the movement direction of a sensing unit and controls said force supplying arrangement to displace said sensing unit in the movement direction, said control means being fed with the measuring signals from said sensing means, and providing in response to touching of an object by said stick a predisplaced position for said stick from its neutral position from which a displacement is to be measured.

6. A sensor according to claim 4, wherein said control means is a signal processing unit supplied with a program, which provides control of the means to force said stick towards said position in accordance with predetermined conditions.

7. A sensor according to claim 4, wherein said control means is supplied with signals concerning movements of a measuring beam, to which the sensor is fixed, said control means providing signals to said means to force said stick to advance said measuring tip of said sensing device in the direction of movement of said measuring beam, and said control means in response to a change of position of said measuring tip from said advanced position controlling said measuring beam to stop further movement and controlling the means to force said stick to reduce the force in said direction of movement.

8. A sensor according to claim 7, comprising a control program for said control means which provides positional data for said measuring tip, said program controlling said measuring beam to move at a maximum speed up to a position prior to a location to be measured, and then at a reduced speed until said tip touches an object, and then braking said measuring beam to stop within a distance corresponding to the position of said measuring stick with respect to said neutral position.

9. A sensor according to claim 4, wherein the means is provided to supply signals which provide a different force to said stick in different directions.

10. A sensor for sensing displacement in a plurality of directions of a measuring tip from a neutral position comprising:
    a) a stationary arrangement including for each sensing direction a pair of electrode plates, receiving individual alternating voltages across each electrode plate and ground, said individual supply voltages for a respective pair of electrode plates having the same frequency but opposite phases, said supply voltages for different pairs of electrode plates for sensing different directions all having different frequencies;
b) a moving unit rigidly joined to said measuring tip and supported in said stationary arrangement, said moving unit including sensing electrode plate means having at least one sensing electrode plate common for all said sensing directions for which deviation is to be indicated;
c) a direction separator circuit which receives output signals from said sensing electrode plate means, said direction separator circuit including, for each direction to be sensed, a phase detector for sensing the phase of a respective sensing supply voltage, said phase detector processing a signal having the frequency of the supply voltages of the pair of electrode plates belonging to the respective direction;
d) each individual phase detector providing a processed output signal representing displacement of said measuring tip from its neutral position in a respective measuring direction.

11. A sensor according to claim 10, wherein said supply voltage frequencies are multiples of each other.

12. A sensor according to claim 10, comprising a first common electrode means adjacent to and insulated from said sensing electrode plate means, said common electrode means being connected to ground.

13. A sensor according to claim 12, comprising a second common electrode means provided on a structural means which supports the first common electrode plate means, and by an operational amplifier means in said direction separator circuit, one input of which is coupled to the first common electrode means, and a second input means, and a second input bootstrapped to the output of said operational amplifier means and connected to said second common electrode means.

14. A sensor for sensing displacement of a measuring tip from a neutral position in a plurality of sensing directions comprising:
a) a stationary arrangement including for each sensing direction at least a pair of voltage supplying electrode plates, each voltage supplying electrode in each pair receiving an individual alternating voltage between said electrode plate and ground, said individual supply voltages for each pair having the same frequency but opposite phases, two of said supply voltages having the same frequency and phase displaced 90° to each other, and a remaining supply voltage having a different frequency;
b) a moving unit rigidly joined to said measuring tip and supported by said stationary arrangement, said moving unit including sensing electrode plate means including at least one sensing electrode plate common for all said sensing directions for which displacement is to be sensed;
c) a direction separator circuit to which a signal from said sensing electrode plate means is fed, said direction separator circuit including, for each direction to be sensed, a separate phase detector for sensing the supply voltage frequency and phase for a respective direction said phase detector signal processing said signal using the supply voltages of the pair of voltage supplying electrode plates belonging to the respective direction; and
d) each phase detector providing a processed output signal representing the displacement of said measuring tip from its neutral position in a respective direction.

15. A sensor according to claim 14, comprising a first common electrode means adjacent to and insulated from said sensing electrode plate means.

16. A sensor according to claim 15, comprising a second common electrode means provided on the same structural means as the first common electrode plate means, and by an operational amplifier means in said direction separator circuit, one input of which is coupled to the first common electrode plate means, and said second electrode means is connected to the remaining inut of said operational amplifier and bootstrapped to the output of said operational amplifier means.

17. A sensor for sensing displacement of a measuring tip from a neutral position comprising:
a) a moving unit including for each sensing direction at least a pair of supplying electrode plates, each supplying electrode plate in each of said pair receiving an individual alternating voltage between said electrode plate and ground, said individual supply voltages for each pair of supply electrodes having the same frequency but opposite phases, said supply voltages for said different sensing directions having different frequencies;
b) a stationary arrangement supporting said moving unit including sensing electrode plate means having at least one sensing electrode plate common for all of said sensing directions;
c) a direction separator circuit connected to said sensing electrode plate means, said direction separator circuit including, for each direction to be sensed, an individual phase detector connected to receive a supply voltage frequency and phase for a respective sensing direction, said phase detector processing a signal from said sensing electrode plate means using the supply frequency of the supply voltages of the pair of supplying electrode plates belonging to the sensed direction;
d) each individual phase detector supplying a processed signal having a certain relation to the displacement of said measuring tip from its neutral position.

18. A sensor according to claim 17, wherein said voltage frequencies are multiples of each other.

19. A sensor according to claim 17, comprising a common electrode means placed adjacent to and insulated from said sensing electrode plate means.

20. A sensor according to claim 17, further comprising a second common electrode means provided on the same structural means as the common electrode plate means, and operational amplifier means in said direction separator circuit, one input of which is coupled to the first common electrode plate means, and said second electrode means is connected to the output of said operational amplifier means which is bootstrapped to its remaining input.

21. A sensor for sensing displacement of a measuring tip from a neutral position comprising:
a) a moving unit, said moving unit including for each sensing direction at least a pair of supplying electrode plates, each supplying electrode plate in each pair being supplied with an individual alternating voltage between an electrode plate and ground, said individual supply voltages for said pair of supply electrodes having the same frequency but opposite phases, two of said supply voltages having the same frequency but phase displaced 90° with respect to each other;

b) a stationary arrangement supporting said moving unit including sensing electrode plate means having at least one sensing electrode plate common for all said sensing directions;

c) a direction separator circuit connected to said sensing electrode plate means, said direction separator circuit including for each direction to be sensed, an individual phase detector for signal processing a signal from said sensing electrode plate means using the supply frequency of the supply voltages of the pair of supplying electrode plates belonging to each direction, each individual phase detector providing a processed signal relating to the displacement of said measuring tip from its neutral position.

22. A sensor according to claim 21, comprising a common electrode means placed adjacent to and insulated from said sensing electrode plate means connected to ground.

23. A sensor according to claim 21, comprising a second common electrode means provided on the same structural means as the common electrode plate means, and by an operational amplifier means in said direction separator circuit, one input of which is coupled to the first common electrode plate means, and said second electrode means connected to the output of said operational amplifier means, which is bootstrapped to said operational amplifier remaining input.

24. A device for positioning a probe of a coordinate measuring machine, said probe having an analogue sensor for sensing a displacement of the probe when it touches an obstacle, comprising:

a) a first force supplier portion joined to a part of the sensor which moves, and a second force supplier portion joined to a stationary part of the sensor, said first and second force supplier portions forming a positioning device which operates in response to a control signal for moving said sensor movable part with respect to said sensor stationary part from a neutral position;

b) control means providing electrical control signals to said position device to set said sensor predisplacement from a neutral position before said sensor touches said obstacle, said control means receiving the measuring signals from said sensing means and providing a control signal in response to touching of said obstacle.

25. A device according to claim 24, wherein said control means receives signals indicating the movement direction of a probe and generates signals to predisplace said sensor element in the movement direction.

26. A device according to claim 24, wherein either the movable or the stationary part of said positioning device is provided with a winding for each direction of movement, and the other of said parts is provided with constantly magnetized magnets for cooperating with the winding, said constantly magnetized magnets and said windings being located so that each winding is traversed by a magnetic field from at least one constantly magnetized magnet, which field is perpendicular to a part of the plane of the winding and a plane outside the winding, said control means providing a current through the winding in one direction to produce a magnetic field opposite to the permanent magnetic field through the winding for forcing the winding in a direction which places the permanent magnetic field towards its center, and supplying an opposite current for repelling the winding in the opposite movement direction.

27. A device according to claim 26, wherein for each said sensing direction said positioning device includes at least two windings.

28. A device according to claim 26, wherein the displacement sensor includes a suspension means providing a floating suspension having a central point around which said moving part is rotational and axially movable along an axis of the sensor, senses the direction and size of axial displacement as well as angular displacements.

29. A device according to claim 26, wherein said control means is a programmed signal processing unit, which controls the positioning device under control of a stored program.

30. A device according to claim 26, wherein said control means receives signals identifying movements of a measuring beam to which the probe is fixed, said control means controlling said positioning device to advance a measuring tip of said probe in the direction of movement of said measuring beam, and said control means during a change of position of said sensing device from said advanced position also provides signals to force said measuring beam to a halt and halt the movement of said measuring tip.

31. A device according to claim 26, comprising a control program for said control means which is used to measure an object from the positional data which has been calculated, said program controlling said control means to take measurements at a plurality of measuring points, said measuring beam being controlled by said program to have maximum speed up to a position slightly before the location of a measuring point, and thereafter to have a reduced speed until touching said object with said probe, then to be braked to stop within a distance coinciding with the displacement of said position sensor.

32. A measuring system for optical and mechanical measuring of an object comprising:

an optical distance measuring unit having a lens unit and means for focusing on the measuring object; and, a mechanical sensor for measuring the position of the object, the sensor having a measuring tip which during mechanical measuring of the object, is displaceable towards the measuring object along the optical axis of the lens towards the measuring object.

33. A measuring system according to claim 32, wherein the measuring tip is placed on a stick which runs through a central through-hole in the lens unit.

* * * * *